(12) United States Patent
Cornell et al.

(10) Patent No.: US 7,698,025 B1
(45) Date of Patent: Apr. 13, 2010

(54) INTEGRATING COMMUNICATION AND SURVEILLANCE

(75) Inventors: Bradley D. Cornell, Lake Stevens, WA (US); Cara Kuan, Redmond, WA (US)

(73) Assignee: The Boeing Company, Chicago, IL (US)

( * ) Notice: Subject to any disclaimer, the term of this patent is extended or adjusted under 35 U.S.C. 154(b) by 854 days.

(21) Appl. No.: 11/532,066

(22) Filed: Sep. 14, 2006

(51) Int. Cl.
*G01C 23/00* (2006.01)
*G05D 1/00* (2006.01)
*G05D 3/00* (2006.01)
*G06F 7/00* (2006.01)
*G06F 17/00* (2006.01)

(52) U.S. Cl. ............................. 701/3; 244/75.1; 342/37

(58) Field of Classification Search .................... 701/4, 701/13, 14, 15, 16, 36, 62, 63, 120, 211, 701/3; 342/37; 700/28, 32; 244/75.1
See application file for complete search history.

(56) References Cited

U.S. PATENT DOCUMENTS

| | | | | |
|---|---|---|---|---|
| 5,459,469 A * | 10/1995 | Schuchman et al. | ........... | 342/37 |
| 6,167,238 A * | 12/2000 | Wright | ....................... | 455/66.1 |
| 6,181,990 B1 * | 1/2001 | Grabowsky et al. | ........... | 701/14 |
| 6,385,513 B1 * | 5/2002 | Murray et al. | ................ | 701/14 |
| 6,577,339 B1 * | 6/2003 | Thompson et al. | ..... | 348/211.14 |
| 6,683,562 B2 * | 1/2004 | Stayton et al. | .............. | 342/182 |
| 6,721,559 B1 * | 4/2004 | Kocin et al. | ................. | 455/431 |
| 6,911,936 B2 * | 6/2005 | Stayton et al. | .............. | 342/182 |
| 6,980,198 B1 * | 12/2005 | Gyde et al. | ................. | 345/157 |
| 2002/0009993 A1 * | 1/2002 | Dastrup et al. | ............. | 455/431 |
| 2003/0025719 A1 | 2/2003 | Palmer et al. | | |
| 2003/0093187 A1 * | 5/2003 | Walker | ......................... | 701/1 |
| 2005/0187677 A1 * | 8/2005 | Walker | ........................ | 701/16 |
| 2006/0183474 A1 * | 8/2006 | Ziarno et al. | ................ | 455/431 |

FOREIGN PATENT DOCUMENTS

| | | |
|---|---|---|
| WO | WO0224530 | 3/2002 |
| WO | WO0225618 | 3/2002 |

OTHER PUBLICATIONS

Search Report for European Application No. EP 07 25 3610 mailed on Jan. 14, 2008 (6 pages).

* cited by examiner

*Primary Examiner*—Khoi Tran
*Assistant Examiner*—Jaime Figueroa
(74) *Attorney, Agent, or Firm*—Lee & Hayes, PLLC

(57) ABSTRACT

An aircraft control unit has modules for interfacing with various systems of an aircraft to integrate control of the systems. The modules include a communication module configured to be coupled to a communication system of the aircraft and a surveillance module configured to be coupled to a surveillance system of the aircraft. The aircraft control unit also includes a display screen for displaying information and a user interface usable to interact with the modules. Each of the modules is configured to display information on the display screen and to receive user input from the user interface.

13 Claims, 25 Drawing Sheets

INTEGRATING COMMUNICATION AND SURVEILLANCE

TECHNICAL FIELD

This disclosure relates generally to integrating control of aircraft systems, and more specifically, to integrating control of communication, surveillance, navigation, and/or other aircraft systems.

BACKGROUND

Traditional aircraft cockpit controls include dedicated control panels for various aircraft systems such as, voice radio tuning, navigation (NAV) radio tuning, weather radar control, transponder control, ground proximity warning system control, satellite communication (SATCOM) control, cabin interphone control, among others. These dedicated control panels are typically installed in an aisle stand of the aircraft. The weight from all of the dedicated control panels used in a single aircraft can be substantial. Also, aircraft aisle stands have limited space, thereby limiting the number of dedicated control panels that may be installed in an aircraft at a given time.

The installation and replacement of dedicated control panels is costly due to the number of panels involved. In addition, airlines must stock sufficient replacement panels for each of the dedicated control panels in an aircraft, which further adds to the costs associated with the dedicated control panel approach.

SUMMARY

This summary introduces simplified concepts of integrating control of communication, surveillance, navigation, and/or other aircraft systems. In one exemplary implementation, an aircraft control unit is configured to control multiple systems of an aircraft. The aircraft control unit has modules for interfacing with various systems of the aircraft. The modules include a communication module configured to be coupled to a communication system of the aircraft and a surveillance module configured to be coupled to a surveillance system of the aircraft. The aircraft control unit also includes a display screen for displaying information and a user interface usable to interact with the modules. Each of the modules is configured to display information on the display screen and to receive user input from the user interface.

In another exemplary implementation, one or more computer-readable media are provided with instructions for displaying a communication interface, including a tuner indicating an active frequency, presenting a designator next to the active frequency, and storing the active frequency to memory for subsequent use, in response to a user request to store the active frequency.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 2 is a block diagram of one of the exemplary aircraft control units

DETAILED DESCRIPTION

Overview

This disclosure is directed to integrating control of multiple systems of an aircraft that traditionally had dedicated control panels located in an aircraft aisle stand. This integration results in substantial reduction in weight and installation costs, by reducing the number of control panels installed in an aircraft. Integrating control of multiple aircraft systems also may reduce inventory costs by minimizing the number of different replacement panels and parts that must be stocked. Moreover, integrated control panels according to some implementations described herein may be expandable and/or upgradeable to control additional aircraft systems.

By way of example, an integrated control unit may be used to tune radios and control other aircraft systems, such as a satellite communication (SATCOM) system, cabin interphone system, ground proximity warning system (GPWSs), weather radar, and air traffic control (ATC) transponder, and traffic alert and collision avoidance system (TCAS). The control unit in such an implementation may also provide control of navigation and/or other systems of the aircraft. The implementations disclosed herein are described in the context of integrating control of multiple systems of a large commercial aircraft. However, it should be understood that the concepts described herein are broadly applicable to virtually any other aircraft applications, such as private aircraft, military aircraft, and the like.

Operating Environment

Figure 1:
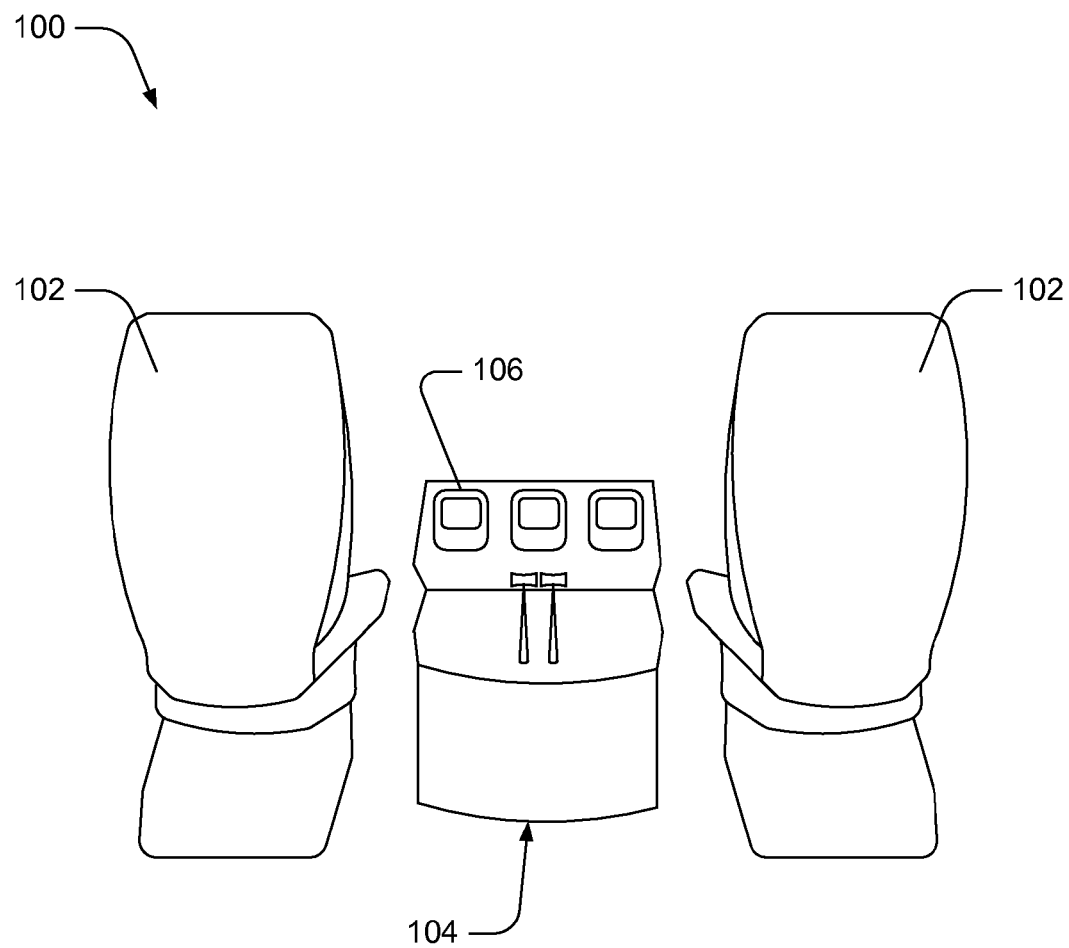
FIG. 1 is a schematic view of an aircraft cockpit, showing an aisle stand with aircraft control units according to one exemplary implementation.

FIG. 1 is a schematic diagram of an aircraft cockpit 100. Two captains' chairs 102 are mounted in the cockpit 100, and an aisle stand 104 is disposed between the captains' chairs. Three integrated control units 106 are disposed in the aisle stand 104 (left, center, and right control units). Each of the control units 106 provides an interface with multiple systems of the aircraft, such as communication, surveillance, navigation, and/or other systems of the aircraft. In this implementation, all three control units 106 are substantially identical and are provided for convenience of use by the pilots or other crew and for redundancy. The size of the aircraft control units may vary depending on the number of aircraft systems the control units are configured to manage, the type of aircraft the control units are intended to be installed in, other features that the control units may have, and the like. In one implementation, the control units have dimensions of not more than about 146 millimeters wide, about 142 millimeters deep, and about 162 millimeters high. Of course, in other implementations the control panels may be any suitable size (larger or smaller), depending on the type of aircraft, available space, ergonomics, and the like.

Any one of the control units 106 may provide full control of all managed aircraft systems. While the number and types of systems controlled by the control units may vary depending on the systems present in the aircraft, compatibility of the systems with the control units, and the like. For example, while three control units are illustrated in FIG. 1, any number of one or more control units may be used. The control units 106 may be expanded or upgraded to control additional systems of the aircraft prior to, during, or after installation by, for example, installing additional or upgraded hardware, software, or a combination of the two. Also, while the control units 106 are shown as being mounted in an aisle stand of an aircraft, they may also be mounted in any other suitable location in an aircraft, such as the instrument panel, for example.

Some aircraft have multiple redundant systems, such as integrated surveillance systems, incorporating separate GPWS, weather radar, ATC/TCAS transponder systems, and the like. In that case, the control unit 106 may be configured to provide an automatic system selection function, which, in the case of a system failure, will automatically switch from a failed system to a backup system. A failure message may or may not be displayed for an automatic system selection, and a status message may be displayed on an engine indication and crew alerting system (EICAS) of the aircraft. If both the left and right systems are failed, an EICAS advisory message may be displayed and the control panels 106 may continue to listen for and automatically select a non-failed system. Manual selection between redundant aircraft systems is provided for each function and can be accessed at any time. If the crew manually selects a failed system an advisory message will be displayed.

Exemplary Control Unit

Figure 2:
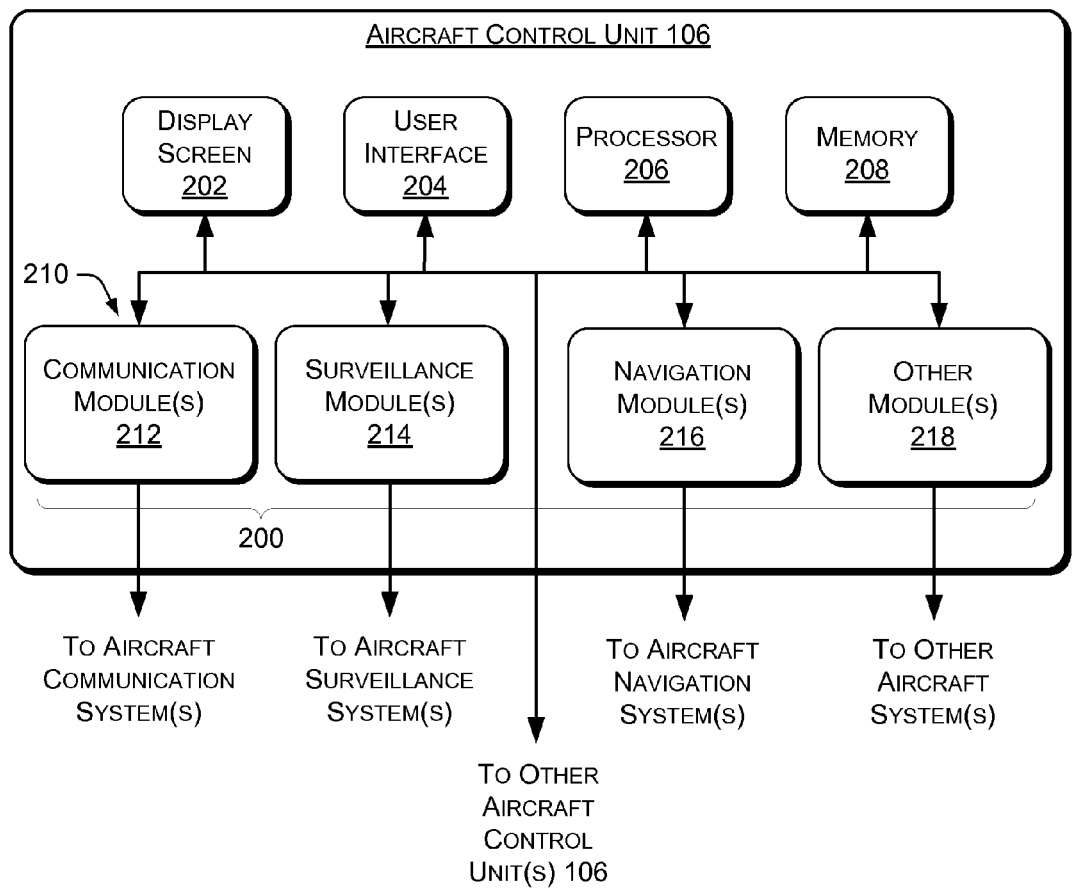
FIG. 2 is a block diagram of one of the exemplary aircraft control units of FIG. 1.

FIG. 2 is a block diagram showing one exemplary implementation of a control unit 106, in which control of multiple aircraft systems is accomplished using a control unit 106 having modules 200 for interfacing with each of the aircraft systems. In some implementations, the modules 200 comprise software programs configured to interface with, interpret data from, and/or otherwise control the various aircraft systems. However, the modules 200 may additionally or alternatively be implemented at least partially as one or more memories, integrated circuits, and/or other hardware.

The control unit 106 comprises a display screen 202 for displaying information to a user about the control unit 106 and the various aircraft systems managed by the control unit 106. A user interface 204 is provided by which the user can interact with the modules 200 to manage the aircraft systems. A processor 206 or other logic is provided to schedule and manage communications between and among the modules 200, display screen 202, user interface 204, and/or a memory 208. Memory 208 may be a standalone memory of the control unit 106, a remote memory storage device, removable and/or nonremovable memory, a combination of the foregoing, or any other combination of one or more computer-readable media. Memory 208 stores data received from the user interface 204 (e.g., user entered radio frequencies, preferences, etc.), the modules 200 (e.g., automatically stored radio frequencies, map data, system status data, sensor data, etc.), and/or from external sources (e.g., new modules, updates, navigation data, map data, etc.). In addition, memory 208 also may include an operating system, one or more application programs, and one or more application programming interfaces (APIs) that facilitate communication between the control unit 106 and the aircraft systems and/or other computing devices. If the modules 200 are implemented at least partially as hardware, one or more of the modules may include their own onboard memory and/or processor, or they may use the processor 206 and memory 208 of the control unit 106.

For the sake of clarity, the modules 200, display screen 202, user interface 204, processor 206, and memory 208 are shown as being in operative communication via a communication bus 210. However, it should be understood that these and other components could be operatively coupled together in numerous different configurations that would be apparent to those of ordinary skill in the art. For example, in one specific implementation, each of the control units 106 receives data from the other control units 106 via a direct connection, such as an ARINC 429 connection (available from Aeronautical Radio, Incorporated, Annapolis, Md.), and from other aircraft systems, such as VHF, HF, and SATCOM radios, cabin interphone, etc., via a common core system (CCS), such as those available from Smith Aerospace Limited, Cheltenham, United Kingdom. The control units 106 are also connected to one another and the other aircraft systems via remote data concentrators (RDCs) to the CCS.

Using the user interface 204, the user can change information displayed on the display screen 202, control functions of the aircraft systems managed by the control unit 106, store data in memory 208 for later use and recall previously stored data, to name just a few. The user interface 204 may include any number of different input and/or output mechanisms, such as dedicated and/or soft buttons, keypads, rockers, graphical user interfaces (GUIs), voice recognition interfaces, and the like. Each of the modules 200 is configured to display information on the display screen 202 and to receive user input from the user interface 204.

In the implementation of FIG. 2, modules 200 comprise one or more communication modules 212 configured to be coupled to corresponding communication systems of the aircraft, one or more surveillance modules 214 configured to be coupled to corresponding surveillance systems of the aircraft, one or more navigation modules 216 configured to be coupled to corresponding navigation systems of the aircraft, and one or more other modules 218 configured to be coupled to other corresponding systems of the aircraft.

Exemplary Module(s)

Figure 3:
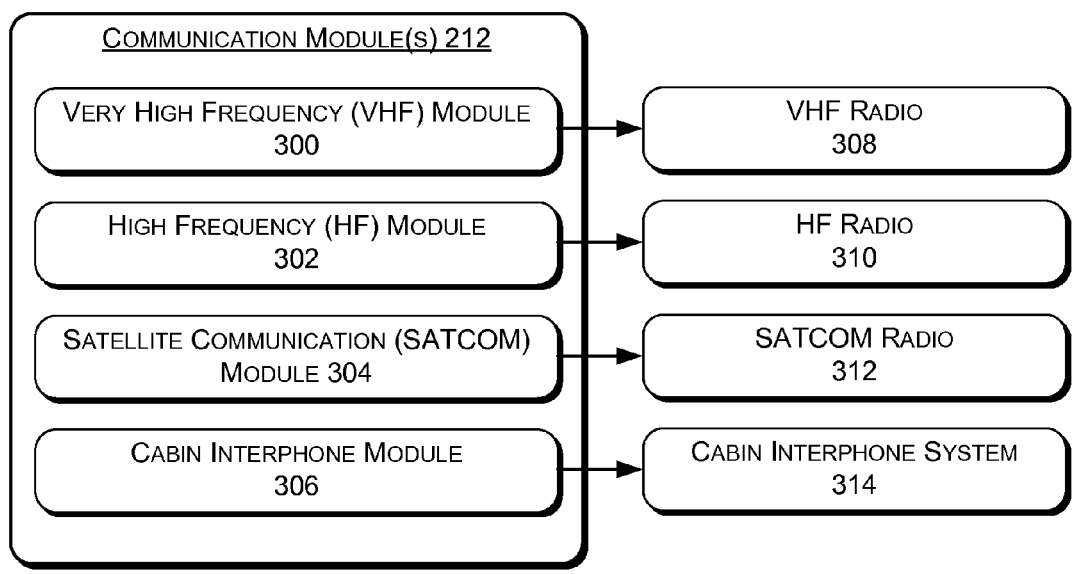
FIG. 3 is a block diagram showing details of communication module(s) of the exemplary aircraft control unit shown in FIG. 2.

FIG. 3 illustrates exemplary communications module(s) 212 of FIG. 2 in more detail. As shown, the communication module(s) 212 comprise a VHF module 300, a HF module 302, a SATCOM module 304, and a cabin interphone module 306, which are configured to be coupled to a VHF radio 308, HF radio 310, SATCOM radio 312, and cabin interphone system 314 of the aircraft, respectively. However, any number of one or more of these or other communication modules could instead be included in other implementations.

Figure 4:
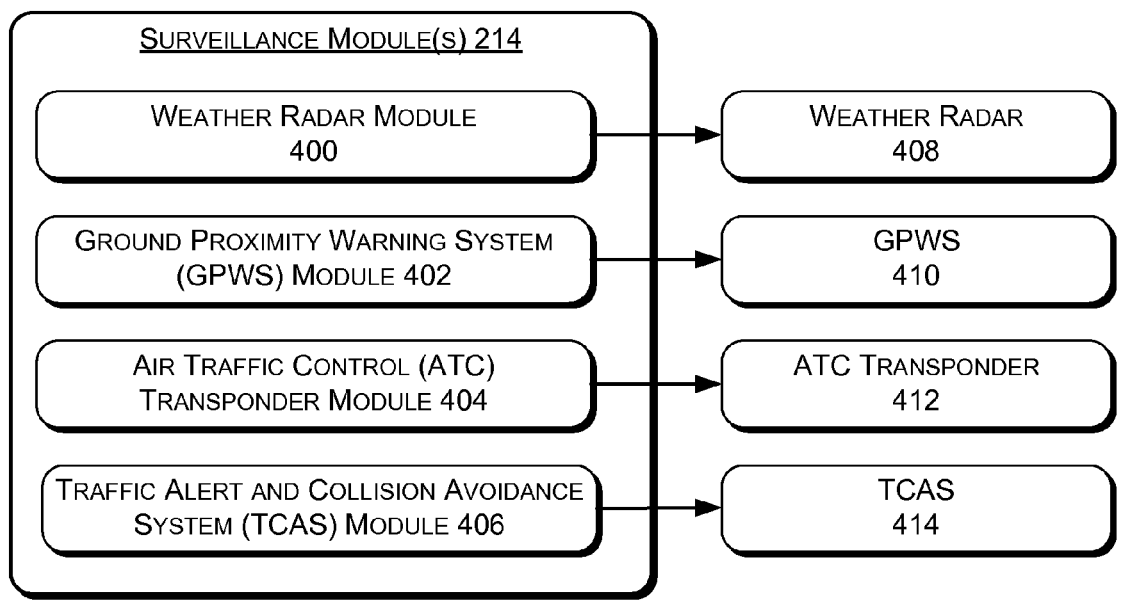
FIG. 4 is a block diagram showing details of surveillance module(s) of the exemplary aircraft control unit shown in FIG. 2.

FIG. 4 illustrates exemplary surveillance module(s) 214 of FIG. 2 in more detail. As shown, the surveillance module(s) 214 comprise a weather radar module 400, a ground proximity warning system (GPWS) module 402, an air traffic control (ATC) transponder module 404, and a traffic alert and collision avoidance system (TCAS) module 406, which are configured to be coupled to weather radar 408, GPWS 410, ATC transponder 412, and TCAS 414 of the aircraft, respectively. However, any number of one or more of these or other surveillance modules could instead be included in other implementations.

Figure 5:
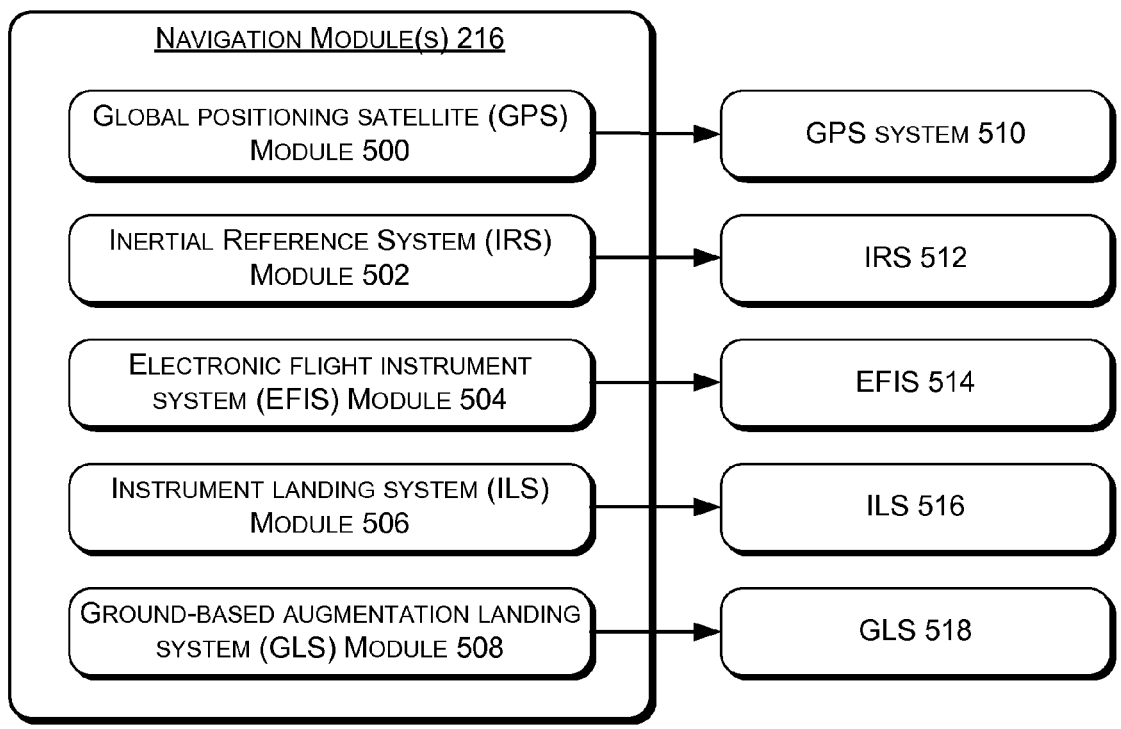
FIG. 5 is a block diagram showing details of navigation module(s) of the exemplary aircraft control unit shown in FIG. 2.

FIG. 5 illustrates exemplary navigation module(s) 216 of FIG. 2 in more detail. As shown, the navigation module(s) 216 comprise a global positioning satellite (GPS) module 500, an inertial reference system (IRS) module 502, an electronic flight instrument system (EFIS) module 504, an instrument landing system (ILS) module 506, and a ground-based augmentation landing system (GLS) module 508, which are configured to be coupled to a GPS system 510, IRS 512, EFIS 514, ILS 516, and GLS 518, respectively. However, any number of one or more of these or other communication modules could instead be included in other implementations.

Figure 6:
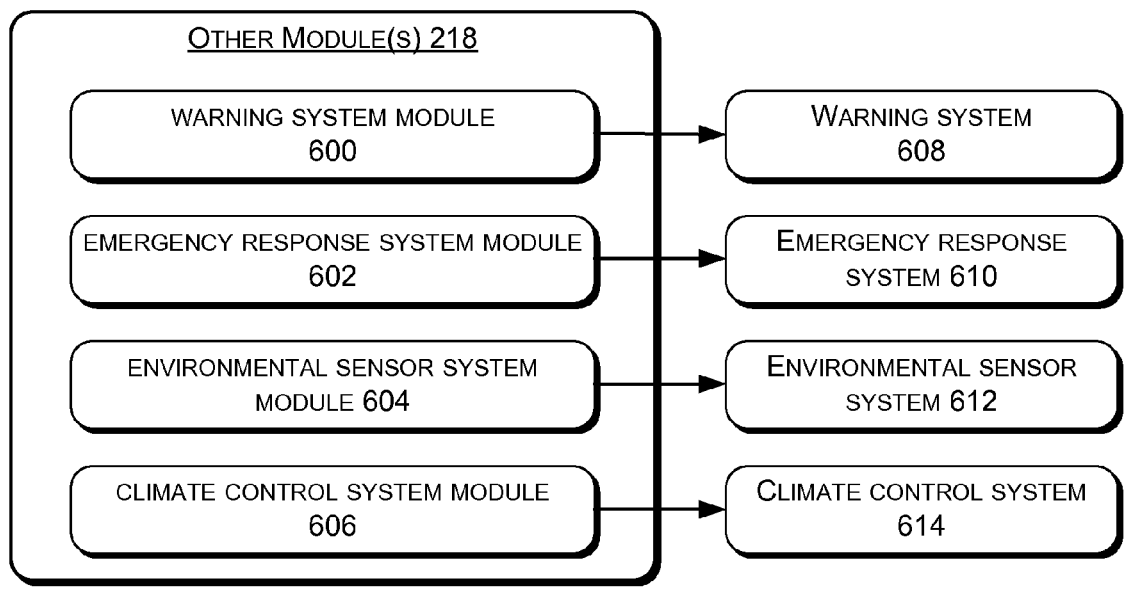
FIG. 6 is a block diagram showing details of other module(s) of the exemplary aircraft control unit shown in FIG. 2.

FIG. 6 illustrates several exemplary other module(s) 218 that may be included in a control unit, such as the one shown in FIG. 2. As shown, the other module(s) 218 comprise a warning system module 600, an emergency response system module 602, an environmental sensor system module 604, and a climate control module 606, which are configured to be coupled to a warning system 608, emergency response system 610, environmental sensor system, and a climate control system, respectively. However, any number of one or more of these or other communication modules could instead be included in other implementations. Some examples of warning systems 608 that may be controlled by a warning system module 600 include an engine indication and crew alerting system (EICAS), a landing gear status warning system, and the like. Some examples of emergency response systems 610 that may be controlled by an emergency response module 602 include fire extinguisher systems, oxygen mask deployment systems, and the like. Some examples of environmental sensor systems 612 that may be controlled by an environmental sensor system module 604 include indoor and/or outdoor temperature sensors, humidity sensors, pressure sensors, and the like. Some examples of climate control systems 614 that may be controlled by a climate control system module 606 include a thermostat, cabin pressure control system, humidifier system, and the like.

While the modules 200 are shown in FIGS. 2-6 as nominally being grouped into the categories of communication modules 202, surveillance modules 204, navigation modules 206, and other modules 208, the modules 200 need not fall into any of those categories or may fit into more than one of those categories (e.g., modules may include aspects of more than one category, such as navigation and surveillance, for example). Also, while the modules 200 are shown as being separate blocks in FIGS. 3-6, multiple modules may be integrated together, such that a single module manage multiple aircraft systems. Conversely, multiple modules may be used to manage different aspects of a single aircraft system.

Also, while the control unit 106 is shown and described as having certain hardware and software elements, it should be understood that the elements discussed above with regard to the control unit 106 may be implemented by software, hardware or a combination thereof. If implemented by software, the software may reside on memory 208, other memory associated with any component of the control unit 106, standalone memory provided in communication with the control unit 106, a remote memory storage device, removable/non-removable memory, a combination of the foregoing, or any other combination of one or more computer-readable media. Any number of programs, modules, data objects, or other data structures may be stored in memory including an operating system, one or more application programs, other program modules, and program data.

Exemplary User Interface and Display

Figure 7:
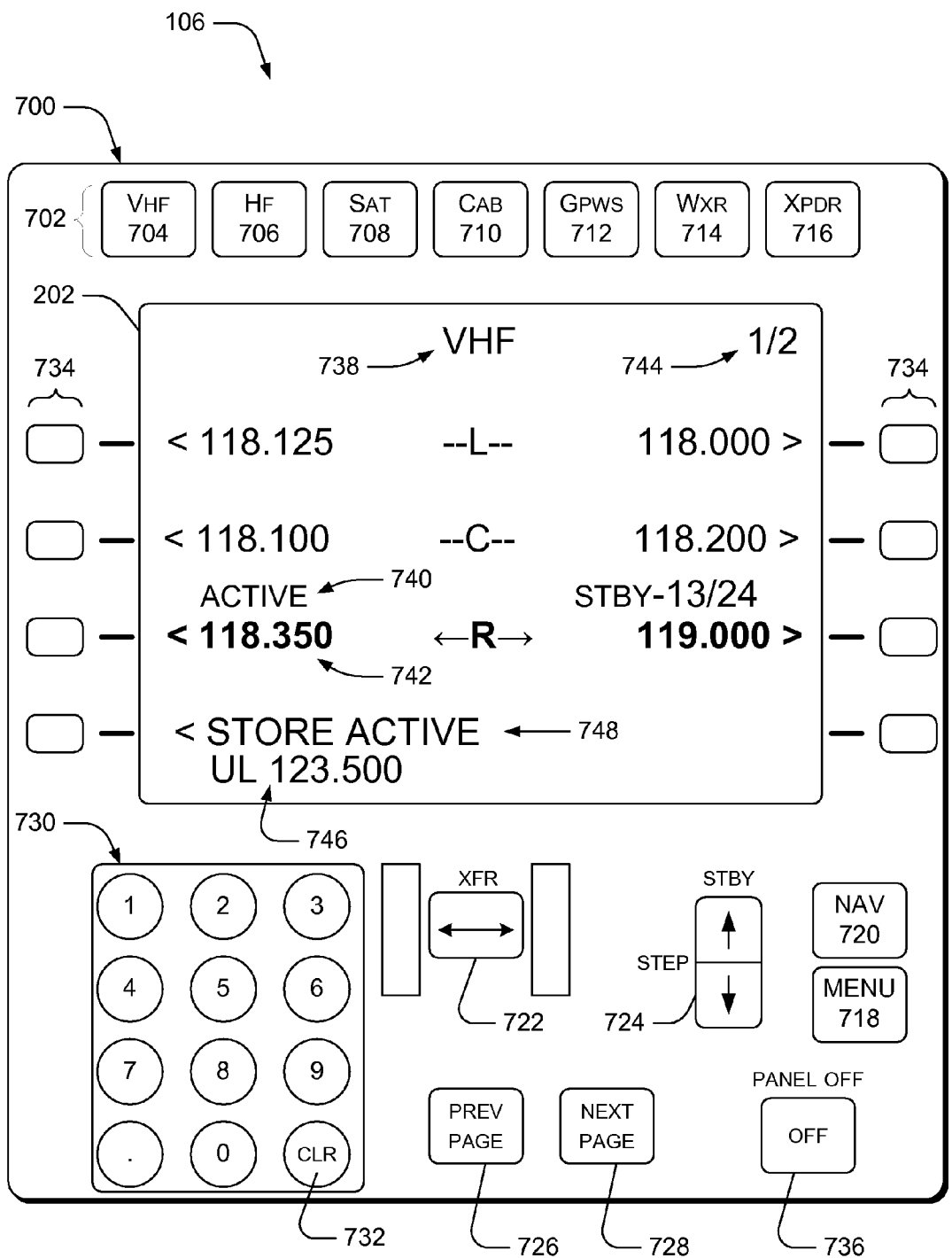
FIG. 7 is a schematic diagram of an exemplary user interface and display screen of a control unit, with an exemplary very high frequency (VHF) radio interface on the display screen.

FIG. 7 is a schematic view of a face plate 700 of a control unit according to one implementation. The faceplate 700 includes a display screen 202 and a user interface 204. The user interface 204 includes a row of dedicated mode select keys 702 located at the top of the control unit 106. The mode select keys 702 include a VHF mode key 704 for selecting a VHF radio interface for display, an HF mode key 706 for selecting an HF radio interface for display, a SAT mode key 708 for selecting a SATCOM interface for display, a CAB mode key 710 for selecting a cabin interphone interface for display, a GPWS mode key 712 for selecting a GPWS interface for display, a WXR mode key 714 for selecting a weather radar interface for display, and an XPDR mode key 716 for selecting a transponder interface for display.

A menu key 718 is located in the lower right-hand corner providing access to backup transponder controls, a miscellaneous radio page, and a surveillance system power control page. A NAV function key 720 located below the display 202 on the right provides access to backup navigation pages.

Transfer (XFR) and standby (STBY STEP) rocker keys 722, 724 are located below the display 202 and are typically used only when the VHF and HF mode buttons are selected. The XFR key 722 toggles ACTIVE and STANDBY frequencies for the selected radio and tunes the selected radio to the new active frequency. The STBY STEP key 724 is used to step up or down through pre-tuned or stored frequencies.

PREV and NEXT PAGE keys 726, 728 are used to change pages for functions that have multiple pages. A keypad 730 is located below the display screen 202 on the left and is used to manually enter and modify data in the "scratchpad" (the bottom line of the display screen 202 is referred to as the "scratchpad") using traditional scratchpad techniques. A clear (CLR) key 732 is used to clear a scratchpad entry or a scratchpad message.

A column of line select keys 734 is disposed vertically along each side of the display 202 and is used to select text adjacent to the line select keys 734 on the display screen 202. In the illustrated implementation, each column includes four line select keys. However, in practice, any number of line select keys may be used in each column. The line select keys are used to move data from the scratchpad to the selected line or to select functions on a page.

Selected text is identified by one or more visual cues, such as larger, bold, or different-colored font, or the like. In one example, a selected state is denoted by large font green text, selected frequencies are indicated by large font white text and Cyan colored ACTIVE and STBY headers and cyan arrow characters located adjacent to the selected radio identifier. Different colors may be associated with different functions and/or different display screens to help users distinguish between the various functions/screens of the control unit. Throughout the drawings, selections referred to as being a certain color are represented by larger and/or bold text.

A panel off button 736 turns the control unit 106 off and may display screen indicating that the control unit is off. Each control unit 106 may incorporate a bezel light sensor (not shown) to automatically control the display lighting. Lighting levels for all three control units 106 can be varied using the aisle stand or master bright lighting controls.

Display Panes/Interfaces

Pages/interfaces displayed on the display screen 202 may include one or more common components. Referring again to FIG. 7, the implementations described herein include five common components on each page:

a page title 738 displayed at the top of the page,
a header title 740 which is the title of the data on the following line,
a data line 742 including prompts, selectors, and/or data associated with the preceding header title 740,
a page number 744 (in page number/total number of related pages) if more than one page exists, and
a scratchpad 746, which is the bottom line of the display 202 and displays entered data, messages, or line selected data (scratchpad data may be retained when switching between some or all modes of the control unit).

The various pages displayed on the display screen will be described below in the order (from left to right) of the mode select keys 702 located at the top of the face plate 700.

VHF Interface

Figure 8:
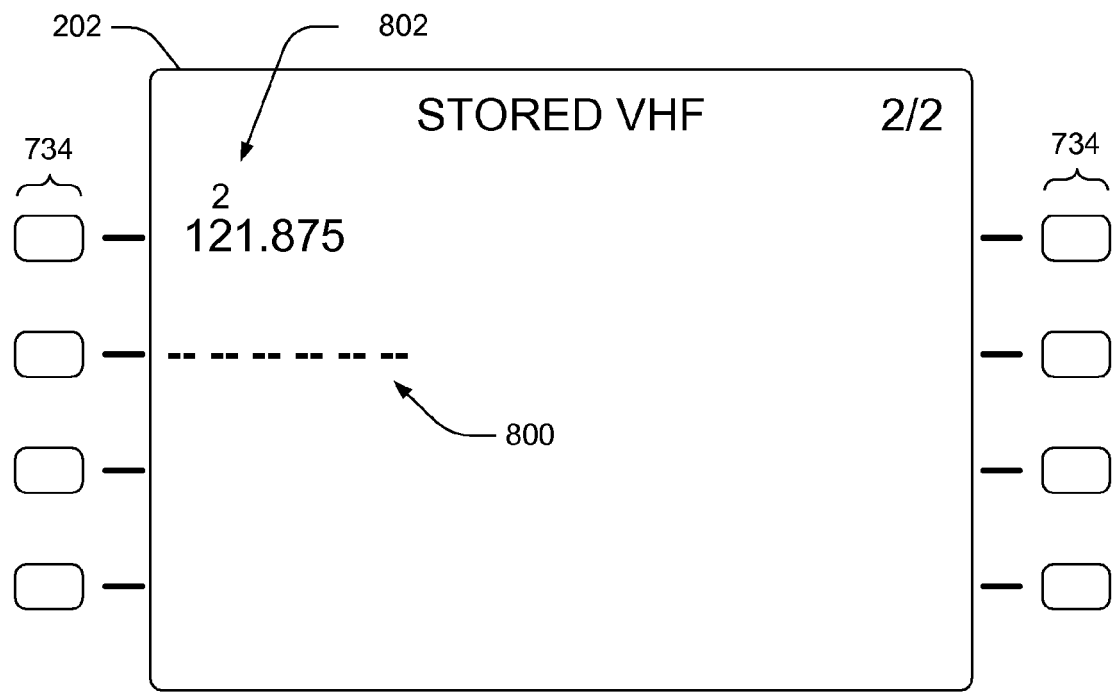
FIG. 8 is a schematic diagram of an exemplary stored VHF radio interface displayable on a control unit.

FIGS. 7 and 8 depict exemplary VHF interface pages for interacting with VHF radios of the aircraft. A user may move between pages of an interface (e.g., pages 1 and 2 of the VHF interface) using the previous and next page keys 726, 728.

By way of background, three VHF radios (not shown) are installed in an aircraft and labeled left, center, and right. Normally, the crew uses the left radio to communicate with air traffic control, the center radio is reserved for data communications, and the right radio is used as required to monitor company communications, automatic terminal information services (ATIS), guard frequency 121.5, or the like. Generally, the left VHF radio is connected to a standby power bus so that, in the event of electrical power loss, the left radio will continue to operate using dedicated 429 data buses to the left control unit 106.

VHF interface pages are used by the flight crew to control the left, center, and right VHF radios. The VHF page layout uses an active-standby two window interface. Using the first page (shown in FIG. 7), entries can be made to either the tuned or standby frequencies for all three VHF radios. Additional pages (shown in FIG. 8) allow entry of stored frequencies which can be accessed as required throughout the flight.

A "STORE ACTIVE" prompt 748 on page 1 of the interface enables the crew to easily store the currently selected radio's active frequency. Stored frequencies can also be line-selected in the scratch pad for entry into any active or standby frequency window. That is, if there was data in the scratchpad, selecting a line select key 734 will enter the data into the corresponding line of the display. Stored frequency data may also be exchanged with one or more onboard or removable storage devices or other computer-readable media.

The three frequencies on the left-hand side of the display 202 are the ACTIVE frequencies. The header text ACTIVE 740 is the label for the entire column and follows the selection of the selected radio. The three frequencies on the right-hand side of the display 202 are standby (STBY) or pre-tuned frequencies. The header text STBY is the label for the entire column and likewise follows the selected radio.

The keypad 730 can be used to enter a frequency into the scratchpad 746. Frequencies can be entered into any of the active or standby frequency windows by selecting the appropriate line select key 734. Selecting a line select key 734 will enter a frequency into the selected window and make that radio the selected radio (designated by the ACTIVE-STBY headers and arrows). Entering a frequency into an active window will automatically transfer the current active frequency to the standby window to facilitate returning to the previous frequency using the transfer key 722. When a line select key 734 is selected, if the corresponding frequency is not valid, the message "INVALID ENTRY" is displayed in the scratchpad. Selecting the CLR key 732 clears the scratchpad message and displays the entered data.

If an ATC uplink is accepted that includes a VHF or HF frequency the uplinked frequency is displayed in the scratchpad 746 on the VHF or HF page as appropriate, as indicated by the uplink indicator (UL) before the frequency in the scratchpad 746. Line selecting the frequency into either the active or standby window on any radio clears the scratchpad. If a VHF radio fails, in-flight dash prompts may be displayed in the active and standby frequency windows for the affected radio.

If frequencies have previously been stored, an X/Y list identifier is displayed next to STBY header. The first number indicates the position in the list and the second number indicates how many total frequencies are stored. Thus, in the example of FIG. 7, 119.000 is the $13^{th}$ stored frequency out of 24 total stored frequencies. Selecting the STBY STEP key 724 steps up or down through the stored frequencies. If no frequencies are stored for the selected radio STBY is displayed in the header instead of STBY X/Y. Each time a frequency is entered into the STBY window it is checked against the stored frequency list. If the standby frequency matches a frequency in the list the appropriate position X/Y will be displayed. When a data-enabled radio is selected, normally the center radio, the DATA tag is accessed by STEPping below frequency 1/X or above X/Y.

FIG. 8 depicts a second or subsequent page of the VHF interface and includes a list of stored, or pre-tuned frequencies. This stored frequency feature may be particularly useful during departures or arrivals where the crew has time and knows what frequencies to enter in advance. In the illustrated implementation, up to eight frequencies can be stored on each page subsequent to page 1. If the eighth frequency is entered on page 2, another page is added and the page identifier changes to 2 of 3 in stead of 2 of 2, and the process continues. The STORE ACTIVE prompt 748 on VHF page 1 (FIG. 7) enables the crew to store the active frequency of the selected radio down into the stored frequency list. The newly added frequency may be added to the stored frequency list in any suitable order. In one implementation, the frequency is added from the top down (i.e., all previously entered frequencies are pushed down one position). Alternatively, frequencies may be added from the bottom up, at positions selected by a user, or in any other suitable order. If the maximum allowed number of stored frequencies is present when STORE ACTIVE 748 is pushed, the last frequency in the list may be deleted. When there are no stored frequencies dash prompts 800 are displayed on page 2.

Entering a frequency in the scratchpad and line selecting over the dash prompts enters the frequency and moves the dash prompts to the next available line. Line selecting a new frequency over an existing stored frequency overwrites the old frequency. Pressing a line select key 734 for an entered frequency down selects that frequency into the scratchpad for entry on page 1. Pressing the CLR key displays CLEAR in the scratchpad. Line selecting CLEAR over a stored frequency deletes that frequency and collapses the list. Selecting the CLR key when CLEAR is displayed in the SPAD displays CLEAR PAGE. Selecting CLEAR PAGE over any stored frequency clears all stored frequencies on that page and the page number is reduced by 1 page.

In FIG. 8, frequency 121.875 is a stored frequency. The superscript 2 above the stored frequency indicates that the frequency is the second stored frequency in the stored frequency list for that radio (the first stored frequency being shown in the standby column on page 1 of the interface).

HF Interface

Figure 9:
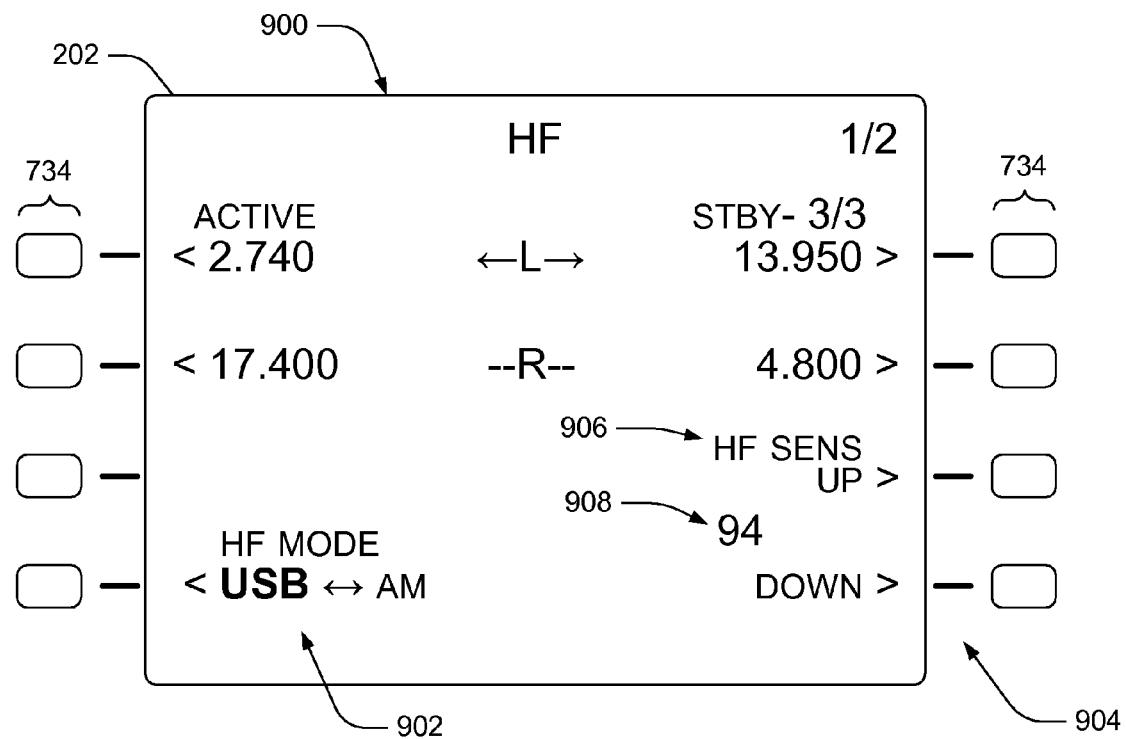
FIG. 9 is a schematic diagram of an exemplary high frequency (HF) radio interface displayable on a control unit.
Figure 10:
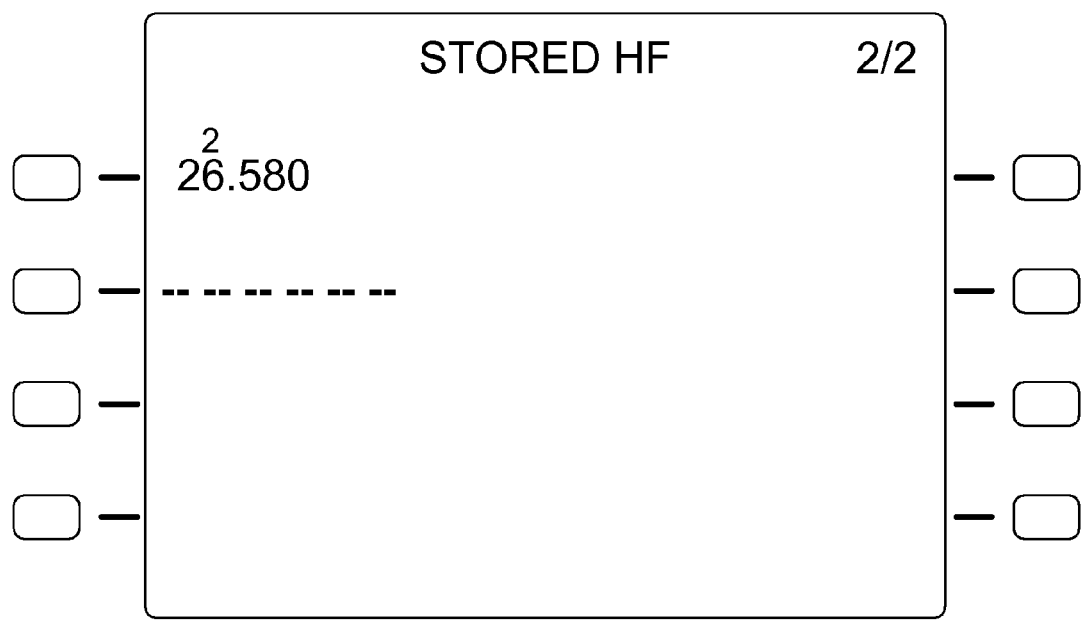
FIG. 10 is a schematic diagram of an exemplary stored HF radio interface displayable on a control unit.

FIGS. 9 and 10 depict exemplary pages 1 and 2, respectively, of an HF interface 900, which is displayed when the HF mode select button 706 on the face plate 700 is pressed. The HF pages are used by the flight crew to control left and right HF radios (not shown). The page layout is similar to that for the VHF pages, except for the addition of prompt 902 to toggle between upper side band (USB) and amplitude modulation (AM) modes, and sensitivity controls 904. For the sake of brevity, only the differences will be described in detail. Entries can be made to either the active or standby frequencies for both HF radios. Additional pages allow entry of stored frequencies which can be accessed in the same manner described above for VHF frequencies. Stored HF frequencies can be useful during oceanic or remote flights when contact cannot be made on a primary frequency.

HF sensitivity can be adjusted up or down (between 0=no volume, and 100=full volume) using the line select keys 734 adjacent to those keys on the bottom right of the display 202. A line header 906 designates the HF sensitivity controls 904, and the current value of HF sensitivity (in this case 94) is displayed at reference number 908.

On aircraft in which HF radios are not installed, a page may be displayed with the message SYSTEM NOT INSTALLED, or some other similar indication. A similar message may be displayed in response to selection of any of the mode select keys 702 corresponding to an aircraft system that is not installed in the particular aircraft.

In some implementations, users may be given the option to inhibit selection of Amplitude Modulation mode. When this option is selected no data will be displayed on header line or data line HF mode prompt 902.

FIG. 10 depicts page 2 of the HF interface, and is used to display stored HF frequencies. The layout and operation of the HF stored frequency page is the same as that of the VHF stored frequency page and will, therefore, not be described further herein.

SATCOM Interface

Figure 11:
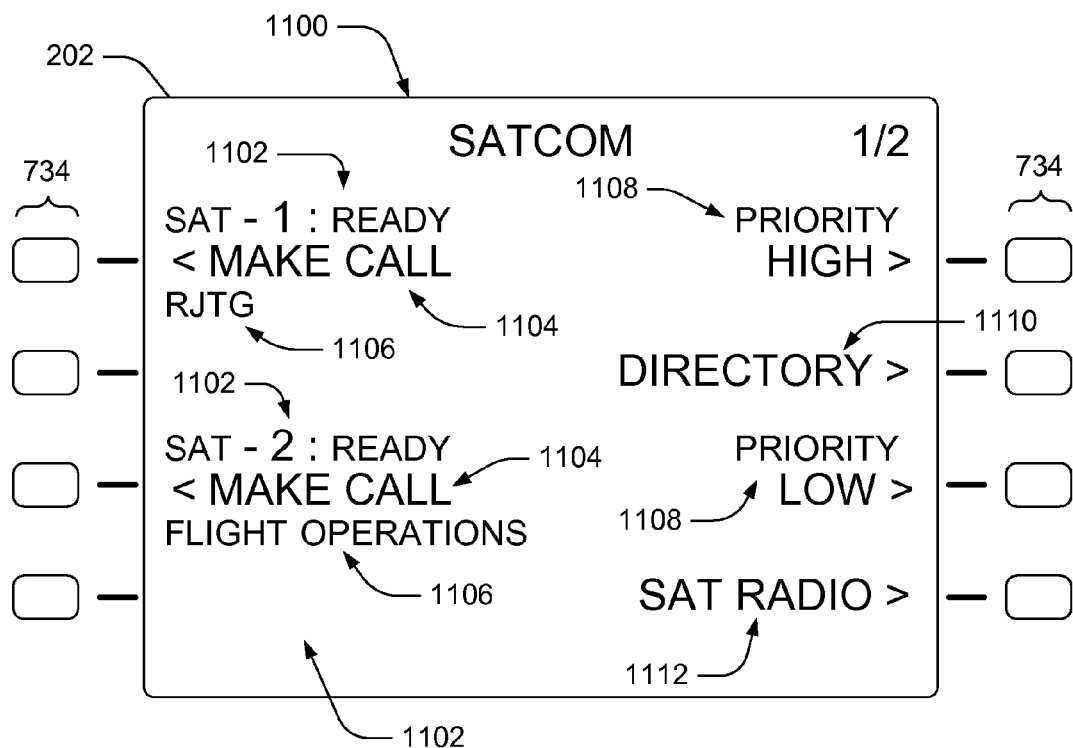
FIG. 11 is a schematic diagram of an exemplary satellite communications (SATCOM) interface displayable on a control unit.
Figure 12:
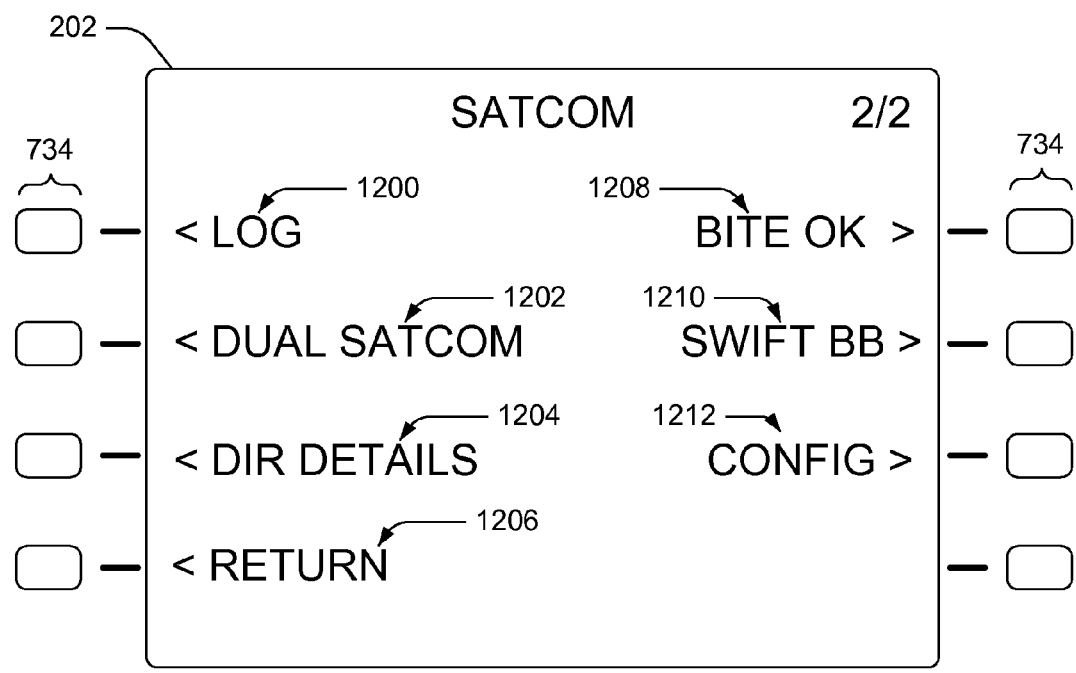
FIG. 12 is a schematic diagram of another exemplary SATCOM interface displayable on a control unit.

FIGS. 11 and 12 depict exemplary pages 1 and 2, respectively, of the SATCOM interface 1100, which is displayed in response to selection of the SAT mode select key 708 on the face plate 700. The SATCOM interface 1100 is used by the flight crew to control the satellite communications system. Controls for placing or ending calls, selecting phone numbers, entering manual dial numbers are accessed on page 1. Page 2 provides access to various settings and configurations.

Referring to FIG. 11, a channel status indicator 1102 indicates whether a satellite channel is READY (available to make a call), in CABIN USE (currently being used by the cabin), DIALING (system is dialing or placing a call), RINGING (the call has been passed through to the Public Switched Telephone Network or PSTN, and is awaiting the ground party to pick up), ANSWERED (the placed call was picked up or answered), NOT READY (the system is not ready to make a call), CALL FAIL (the call has for some reason failed to get through), and GND CALL (there is an incoming call).

In order to place a SATCOM call, a user presses a line select key 734 adjacent to a MAKE CALL prompt under the header for the desired satellite channel. A call will then be placed to the identifier 1106 below the selected MAKE CALL prompt 1104. The identifier 1106 is a name associated with a number that is to be dialed. Once the call is in progress, the MAKE CALL prompt changes to an END CALL prompt, selection of which cancels the existing call and returns the prompt to MAKE CALL. Thus, if the line select key 734 corresponding to the MAKE CALL prompt 1104 under the heading SAT-1 1102, a call will be placed to the number associated with the identifier RJTG, using the first satellite channel.

During use, various different prompts may be displayed, including PREEMPT (used to override a call in progress with the current selected call), CLR STATUS (used to clear the status CALL FAIL), MANUAL ENTRY (used to confirm a manually entered call number), ANSWER (used to answer an incoming call), REJECT (used to reject an incoming call), and QUEUE CALL (used to automatically place a selected SATCOM call when the call in progress has ended; when pushed, the QUEUE CALL prompt changes to an END QUEUE prompt).

The priority of a call may be set using a line select key adjacent to a PRIORITY prompt 1108 corresponding to the desired satellite channel. Pushing the button next to the PRIORITY prompt toggles the call priority between LOW, HIGH, and emergency (EMG). This helps to ensure that a high priority call will be successfully connected over lower priority calls that may be currently in progress within a particular satellite region. Toggling the priority to EMG (and then making the call) will provide a guaranteed channel to be allocated and may result in a lower priority call from a different aircraft being terminated. Selection of EMG, rather than HIGH will result in emergency indications at the satellite ground station that the aircraft is currently logged on to.

Directory and sub-directory pages are used to organize stored phone numbers and may be displayed by pressing a line select key adjacent to a DIRECTORY prompt 1110. Once a particular directory is selected, the phone numbers contained in that directory are displayed. Each telephone number will occupy a line. Selecting the corresponding line select key in the left column will transfer that phone number to SAT-Phone Channel 1, and selection of the corresponding line select key in the right column will transfer that phone number to SAT-Phone Channel 2. Once a telephone number is selected, the page will switch to the SATCOM main menu where it is now ready for the call to be placed through by pressing MAKE CALL 1104.

A SAT-RADIO prompt 1112 may be provided and allows pilots to operate SATCOM in a similar manner to VHF radio. By selecting the line select key adjacent to prompt 1112, SATCOM will switch to another menu (not shown) and communications are made in a Party-Line Voice mode, in which any aircraft within the same caller group will hear all of the voice traffic as it currently is happening for VHF radio. This allows for operational awareness of other aircraft in oceanic regions.

To manually dial a phone number, the number is entered via the scratchpad. The MAKE CALL prompt 1104 will change to MANUAL ENTRY, selection of which will transfer the scratchpad number into the selected channel. Once the channel is selected, the MANUAL ENTRY prompt will change back to MAKE CALL, selection of which will place the call. This extra step allows the pilot to change the priority level of the manually dialed number or check that it has been entered correctly, before making the call.

If no SATCOM systems are installed in the aircraft, selecting the SAT mode select key 708 will display an indication to that effect.

FIG. 12 illustrates a second page of the SATCOM interface, which displays the following prompts: LOG 1200, DUAL SATCOM 1202, DIR DETAILS 1204, RETURN 1206, BITE OK 1208, SWIFT BB 1210, and CONFIG 1212. In practice, the SATCOM interface may include some or all of these prompts.

The LOG prompt 1200 displays a log page used to control the SATCOM system connection to the Satellite. The pilot has the ability to change the Ground Earth Station (GES) to which the airplane is logged onto. Signal levels can also be monitored from this page.

The DIR DETAILS prompt 1202 displays a list of phone number identifiers sequentially. From the DIR DETAILS page(s), changes may be made to stored phone number details, or new numbers can be entered into memory.

The DUAL SATCOM prompt 1204 displays a dual SATCOM page indicating which SATCOM (Left or Right) is active. The secondary SATCOM system is designed to be a "hot standby," such that if there is a failure in either of the SATCOM systems, the other one will become the active SATCOM and assume normal operations.

The RETURN prompt 1206 returns to the main SATCOM page.

The BITE OK prompt 1208 displays a BITE page used for maintenance operations. An indicator, such as *, will be added to the BITE OK prompt 1208 if there is a fault with a cockpit voice channel, but the SATCOM itself is still operational on the remaining voice channel.

The SWIFTBB prompt 1210 provides control for the broadband functions of the SATCOM system known as Swift Broadband (SwiftBB).

The CONFIG prompt 1212 displays the associated part numbers for the SATCOM system, information about the hardware configuration of the SATCOM system (e.g., number of channels installed, number available, etc.).

Cabin Interphone Interface

Figure 13:
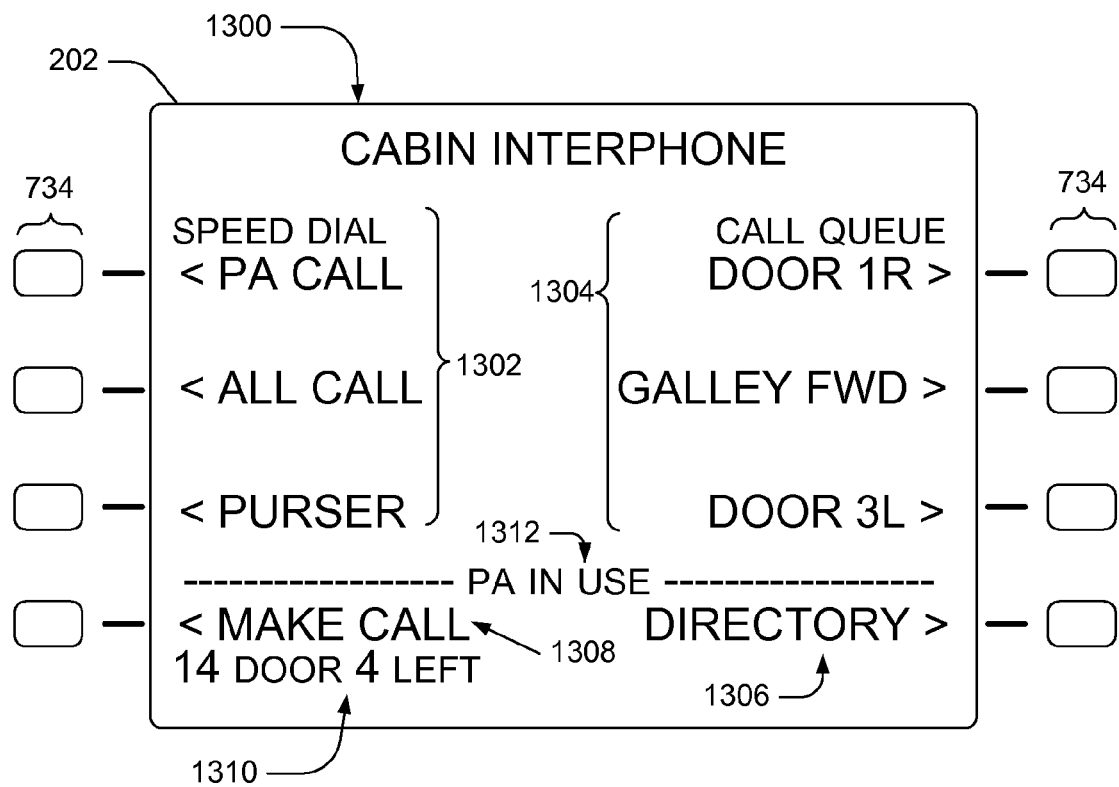
FIG. 13 is a schematic diagram of an exemplary cabin interphone interface displayable on a control unit.
Figure 14:
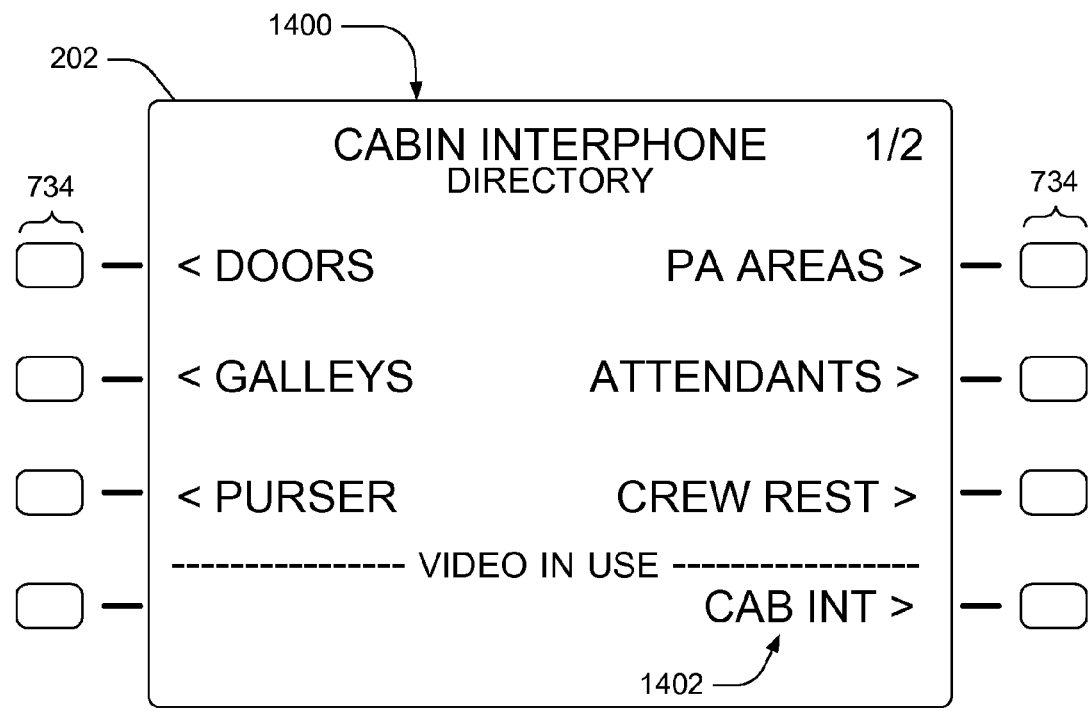
FIG. 14 is a schematic diagram of an exemplary interphone directory displayable on a control unit.

FIGS. 13 and 14 depict exemplary main and directory pages, respectively, of a cabin interphone interface 1300, which is displayed in response to user selection of the cabin interphone mode select key 710 on the face plate 700. The cabin interphone interface can be accessed on all three control units 106 simultaneously, if desired.

By way of background, the cabin interphone system provides voice communications between the flight deck and flight attendant stations throughout the aircraft. One or more cabin interphone station(s) must be selected and a call initiated from the control unit 106 to alert the desired station to pick up the call.

The cabin interphone main page shown in FIG. 13 allows the pilots to send or end calls. Calls are sent by selecting a station or group of stations from a speed dial menu 1302 or a directory (not shown). The speed dial menu 1302 includes a list of prompts (three are shown: PA CALL, ALL CALL, and PURSER) under the heading SPEED DIAL. Selection of the line select key next to any of the prompts places a call to the designated station or group of stations using a single button. Speed dial list may be defined by the user. Multiple speed dial lists may be defined (e.g., one for on the ground and another for in the air).

The cabin interphone interface 1300 also includes a CALL QUEUE 1304, which displays additional incoming calls in the queue when the flight deck is involved in a call. In the example shown, up to three calls can be displayed in order of the priority. In one implementation, priority may be assigned as follows (from highest to lowest): pilot alerts, conference calls, cabin calls, and other calls. The PILOT ALERT queue entry is displayed only when the flight deck is using the PA and an incoming call is received. When there are three calls in the queue and a new, higher priority call is received, the lowest priority call is removed from the queue and the new call is displayed in the proper priority. Pressing the line select key next to one of the prompts in the CALL QUEUE initiates a call back to the displayed station(s) or, if a call is in progress, adds station(s) to the existing call.

The directory may be accessed by the user pressing a line select key adjacent to a DIRECTORY prompt 1306. The directory of stations may be created by the airline. An exemplary directory page is shown by reference number 1400 in FIG. 14. The cabin interphone directory page(s) 1400 are used to access subdirectory pages. Each prompt displayed on the directory page of FIG. 14 is the name of a subdirectory where the dial code labels of the individual stations or functions are listed. Selection of the specific location(s) is accomplished on a specified subdirectory page (not shown).

Two digit station codes may also be manually entered into the scratchpad, and the call sent using a MAKE CALL prompt 1308. A list of the two digit station codes may be located on a handset (not shown). Once a call is placed, the MAKE CALL prompt 1308 changes to END CALL, which when pressed ends the call. A CURRENT CALL designator 1310 displays the most recently selected dial code and label when a call is being connected; the dial code (just the number) is removed when call is established.

A status designator 1312 indicates a status of the cabin interphone with indicators such as PA IN USE (which indicates that a portion of the airplane public address system is in use, or both the PA and video entertainment systems are in use) and VIDEO IN USE (which indicates that a portion of the video entertainment system is in use). A blank or dashes in the status designator 1312 indicates that neither the PA nor video system is in use.

In addition to the subdirectory prompts listed on the cabin interphone directory page 1400, a CAB INT prompt, which when selected returns the display to the cabin interphone main menu page.

GPWS Interface

Figure 15:
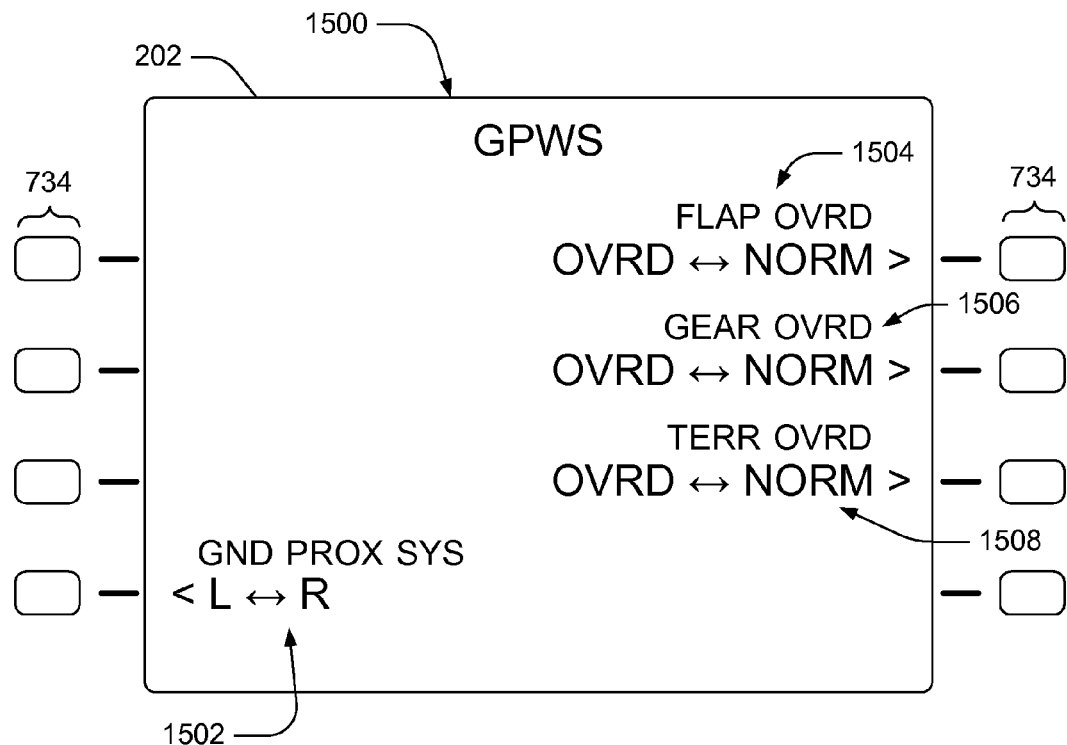
FIG. 15 is a schematic diagram of an exemplary ground position warning system (GPWS) interface displayable on a control unit.

FIG. 15 depicts an exemplary ground proximity warning system (GPWS) interface 1500, which is displayed upon selection of the GPWS mode select key 712 on the face plate 700. The GPWS interface 1500 is used to control selected ground proximity warning system alert inhibits. The crew is normally prompted to select these alert inhibits as part of a checklist item. EICAS ADVISORY messages are provided for each inhibit when override state (OVRD) is selected. In the illustrated implementation, there are two GPWS systems installed labeled L for left and R for right. The default selection is the left system. The crew can select the right system by selecting the line select key corresponding to that system. If the selected system fails, the other system will be selected automatically by the control unit 106. If both the left and the right system fail, the control unit 106 may continuously monitor the GPWS system status and reselect the first system (left or right) that indicates normal operation.

The GPWS interface 1500 includes a GND PROX SYS prompt 1502 which, when selected, toggles between the left and right GPWS systems. The GPWS interface 1500 also includes a flap override (FLAP OVRD) prompt 1504 selection of which inhibits a TOO LOW FLAPS alert, a gear override (GEAR OVRD) prompt 1506 selection of which inhibits TOO LOW GEAR and CONFIG GEAR alerts, and a terrain override (TERR OVRD) prompt 1508 the selection of which inhibits LOOK-AHEAD OBSTACLE and TERRAIN alerts. All overrides may be reset at completion of the flight.

Weather Radar Interface

Figure 16:
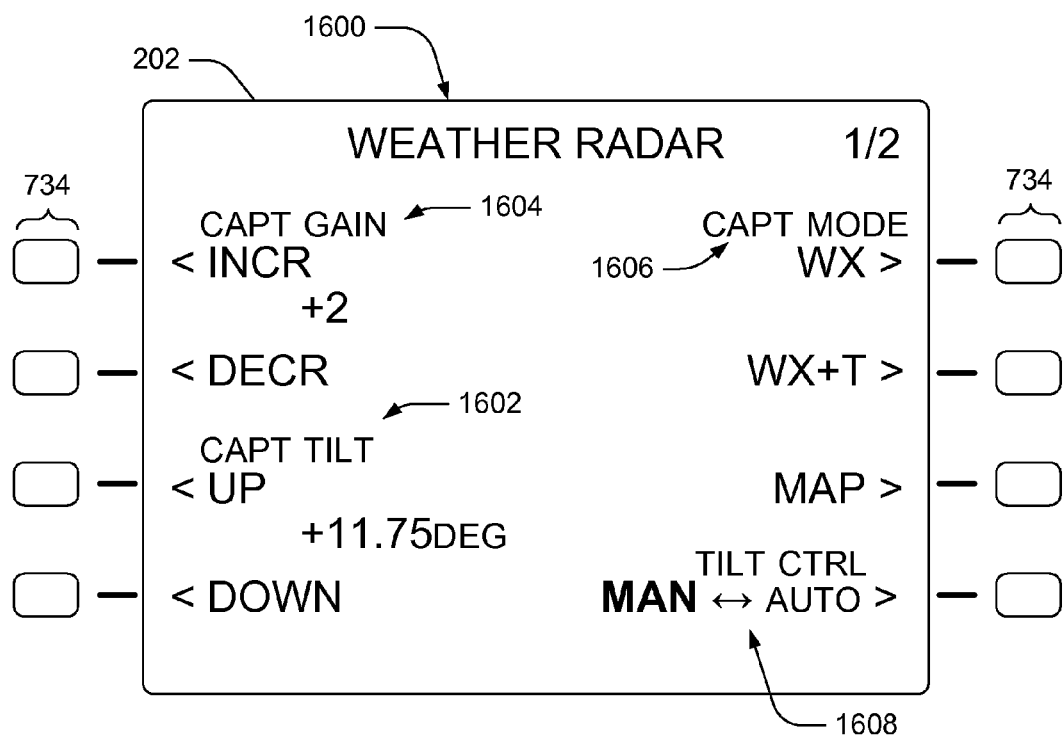
FIG. 16 is a schematic diagram of an exemplary weather radar interface displayable on a control unit.

FIG. 16 depicts an exemplary weather radar interface 1600, which is displayed upon selection of the WXR mode select key 714 on the face plate 700. The weather radar interface 1600 includes control prompts for TILT 1602, GAIN 1604, and MODE 1606, which are independent for each control unit. A control prompt for AUTO and manual (MAN) tilt control 1608 under the heading TILT CTRL is dependent and is synchronized between units. In the case where three control units are present, the captain's control unit 106 controls the captain's display for tilt, gain and mode, and the first officer's control unit 106 controls the first officer's display. When the WXR mode select key 714 is selected on the center control unit 106, a page is displayed that allows the crew to select captain or first officer. Once that selection is made the appropriate page is displayed. If the center control unit 106 is selected to weather radar when either the captain's or first officer's control unit 106 is selected to weather radar, the displays will be identical and the last key press will be reflected on both displays. The tilt, gain, mode and tilt control default settings may be defined by the customer, and may be reset at flight completion.

Selecting the line select key under the CAPT GAIN heading 1604 takes the gain out of calibration mode and displays a numerical gain value, which may be increased or decreased by pushing line select keys next to INCR and DECR prompts, respectively. In some implementations, the gain range is +3 to −3. CAPT GAIN values may also be entered in the scratchpad and transferred using either the INCR or DECR line select keys. If an invalid entry is made the INVALID ENTRY scratchpad message is displayed.

Selecting a line select key next to one of the weather radar modes (WX, WX+T, or MAP) under the CAPT MODE heading 1606 selects a desired weather radar mode.

Selecting a line select key next to the MAN-AUTO prompt 1608 under the TILT CONTROL heading toggles the weather radar control between auto and manual modes. Tilt UP and DOWN prompts may be shown when MANual mode is selected and moves the radar antenna by a predetermined amount (e.g., $1/10^{th}$ of a degree). Pushing and holding the UP or DOWN control may rapidly increment/decrement the radar antenna tilt until released.

When MANual mode is selected the tilt setting last used by the automatic mode is displayed. TILT CONTROL values may also be entered in the scratchpad and entered transferred using either the UP or DOWN line select keys. If an invalid entry is made the INVALID ENTRY scratchpad message is displayed.

Figure 17:
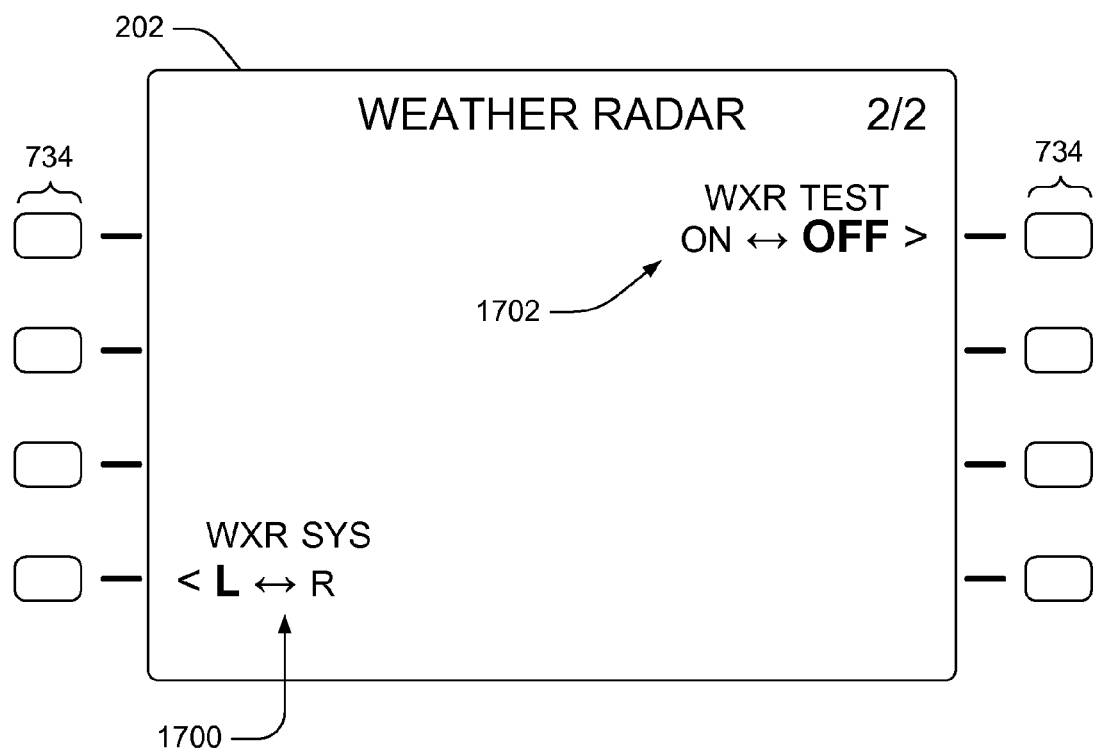
FIG. 17 is a schematic diagram of another exemplary weather radar interface displayable on a control unit.

A second page of the weather radar interface is shown in FIG. 17, which may be displayed by pressing the next page button 728. The second page includes a weather radar system (WXR SYS) selection prompt 1700, which toggles the weather radar system interface between the left and right weather radar systems, if present. The default selection is the left system.

The second page also includes a weather radar test (WXR TEST) prompt 1702, which selects the weather radar system to the TEST mode to display a test pattern and test pass fail status on the display.

Selecting the WXR mode key 714 on the center control unit 106 displays a Captain, First/Officer selection page. Selecting either the CAPTAIN or F/O selection displays the appropriate weather radar pages.

Transponder Interface

Figure 18:
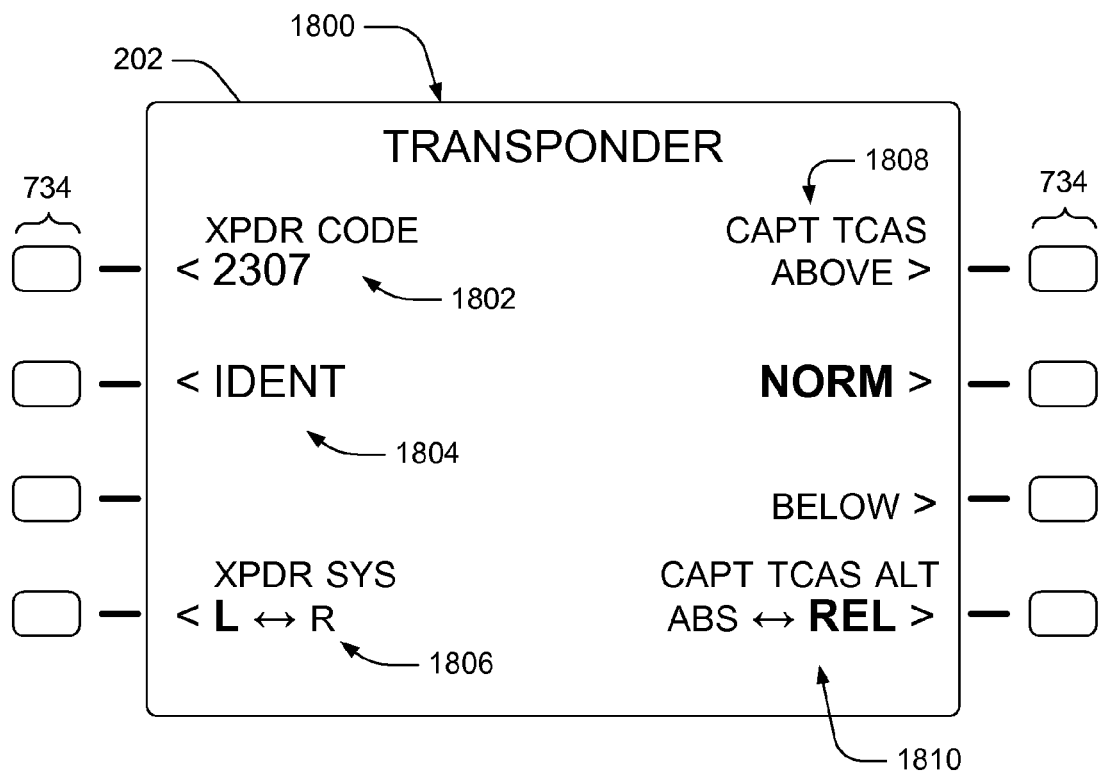
FIG. 18 is a schematic diagram of an exemplary transponder interface displayable on a control unit.

FIG. 18 depicts an exemplary transponder interface 1800, which is displayed upon selection of the XPDR mode select key 716 on the face plate 700. The transponder interface 1800 allows the crew to control the air traffic control (ATC) transponder and traffic alert collision avoidance system (TCAS) of the aircraft. The interface 1800 includes a transponder code (XPDR CODE) heading 1802, under which is displayed the current ATC transponder code. Transponder code may be entered into the scratchpad and then selected using the top left line select key.

An identifier prompt (IDENT) 1804 is also displayed on the transponder interface, the selection of which instructs the transponder to transmit an identifying signal to air traffic control. A transponder system (XPDR SYS) toggle prompt 1806 toggles selection of the left or right ATC transponder/TCAS system. The left system is the default selection.

A captain TCAS (CAPT TCAS) heading 1808 is followed by three prompts (ABOVE, NORM, and BELOW) which may be used to select a display mode of the TCAS system. Of the available modes, ABOVE increases extent of airspace higher than a current altitude in which TCAS tracks aircraft, but does not change the normal extent of airspace below current altitude in which TCAS tracks aircraft. The NORM mode is the normal extent of airspace in which TCAS tracks aircraft. The BELOW mode increases extent of airspace below current altitude in which TCAS tracks aircraft, but does not change the normal extent of airspace higher than current altitude in which TCAS tracks aircraft.

Under a captain TCAS altitude (CAPT TCAS ALT) heading is an ABS/REL toggle prompt 1810, which may be used to toggles between absolute and relative altitude modes. The TCAS mode (above, norm, below) and alt (absolute/relative) controls can be defined by the customer. The default settings may be reset at flight completion.

When multiple control units are present, the captain's control unit 106 controls the captain's display for TCAS, the first officer's control unit 106 controls the first officer's display, and when XPDR mode select key 716 is selected on the center control unit 106, a page is displayed that allows the crew to select captain or first officer to display the appropriate page.

Navigation Interface

Figure 19:
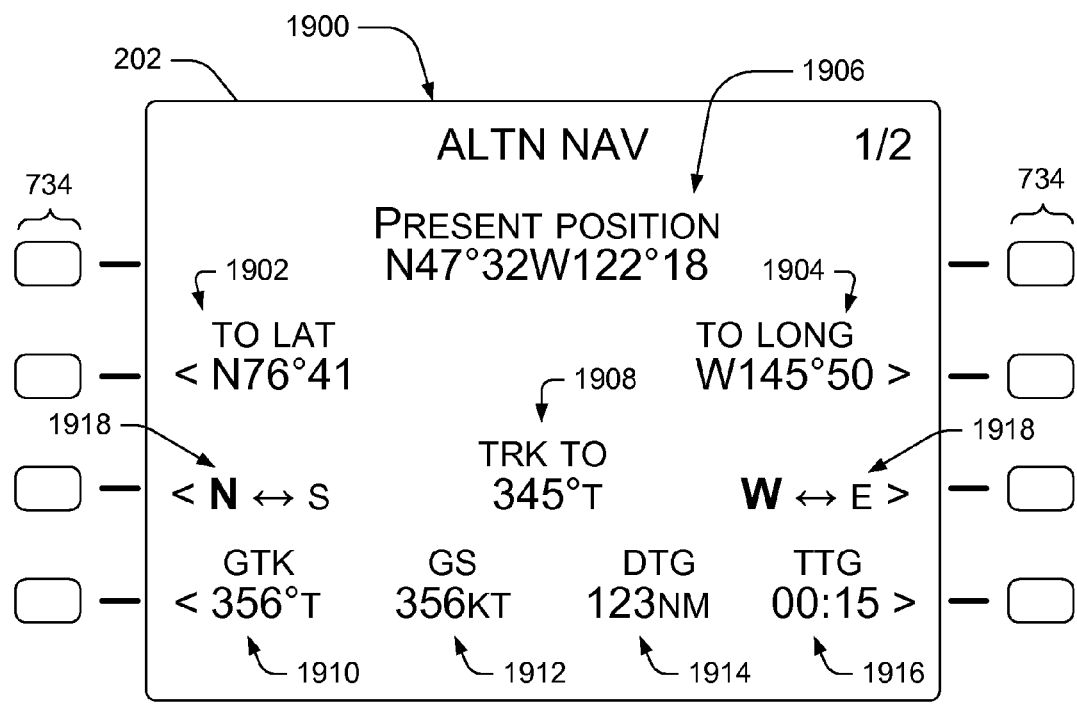
FIG. 19 is a schematic diagram of an exemplary alternate navigation (ALTN NAV) control interface displayable on a control unit.
Figure 20:
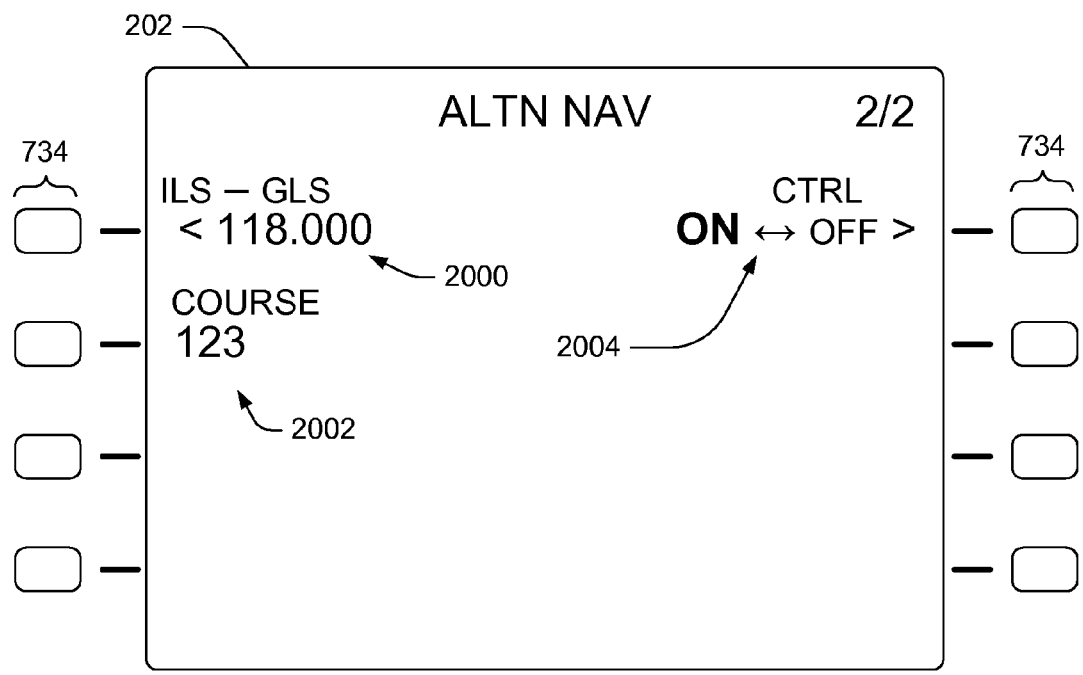
FIG. 20 is a schematic diagram of another exemplary ALTN NAV interface displayable on a control unit.

FIGS. 19 and 20 depict pages 1 and 2 of an exemplary navigation interface 1900, which is displayed upon selection of the NAV key 720 on the face plate 700. The navigation interface 1900 in this embodiment is for an alternate navigation system of the aircraft.

A first page of the navigation interface 1900 enables the crew to input a single waypoint latitude 1902 and longitude 1904, and display a present position 1906 in left integrated navigation receiver (L-INR) latitude and longitude to the nearest whole minute, a TRACK TO bearing 1908, true ground track (GTK) 1910, ground speed (GS) 1912 to the nearest whole degree, Distance To Go (DTG) 1914 to the nearest whole knot, and Time To Go (TTG) 1916 to the waypoint.

Latitude and a longitude values may be entered in DDDMM format via numeric keypad entry in the scratchpad and using line select keys next to hemisphere toggling prompts 1918. The control unit 106 defaults the user-entered latitude and longitude hemisphere selections to the current latitude/longitude hemispheres.

In the implementation shown, once a waypoint is entered into the "To" waypoint position, the avionics system calculates and displays the DTG in nautical miles (nm) between the current aircraft position and the designated "To" waypoint. The distance calculation is performed to an accuracy greater than or equal to 10 nm. The DTG is updated at least once every 5 seconds.

The avionics system calculates and displays the desired track (TRK TO) in whole degrees from the current aircraft position to the entered "To" waypoint. The track calculation is performed to an accuracy greater than or equal to 1 degree. The desired track is updated at least once every 5 seconds. The TRK TO field may be displayed in a different color, such as magenta to differentiate it as the commanded course to the waypoint.

The avionics system calculates and displays the TTG in HH:MM format from the current aircraft position to the "To" waypoint, based on the current aircraft groundspeed. The TTG calculation has an accuracy greater than or equal to 1 minute. The time to go is updated at least once every 5 seconds.

With a waypoint entered, entry of either a new latitude or longitude may cause dash prompts to be displayed in the other field and all "track to," "time to," and "distance to," information to blank, forcing the crew to enter an entire new waypoint latitude and longitude value.

Page two of the navigation interface 1900 is shown in FIG. 20, and allows the crew to tune the left Integrated Navigation Radio (INR) and display deviations on the Integrated Standby Flight Display (ISFD). Page 2 displays the most-recently tuned ILS/GLS frequency 2000 and course 2002. The control unit 106 provides a manual control (CTRL) ON/OFF prompt 2004 to enable backup navigation tuning Frequency and course information will be displayed with the CTRL selection in both OFF and ON selections.

The control unit 106 normally inhibits the ALT NAV RADIO function by preventing user entry and displaying the ILS-GLS and COURSE fields in cyan. The control unit 106 generates a signal to a Crew Alerting System (CAS) when control unit 106 backup navigation tuning is enabled. An EICAS message (ALTN NAV RADIO) may be displayed when the control unit 106 sets this signal. Once backup navigation tuning is enabled, the control unit 106 allows user entry of an ILS/GLS frequency and associated course, which is provided by the navigation radios to the Integrated Standby Flight Display (ISFD) for performing an instrument landing.

MENU Interface

Figure 21:
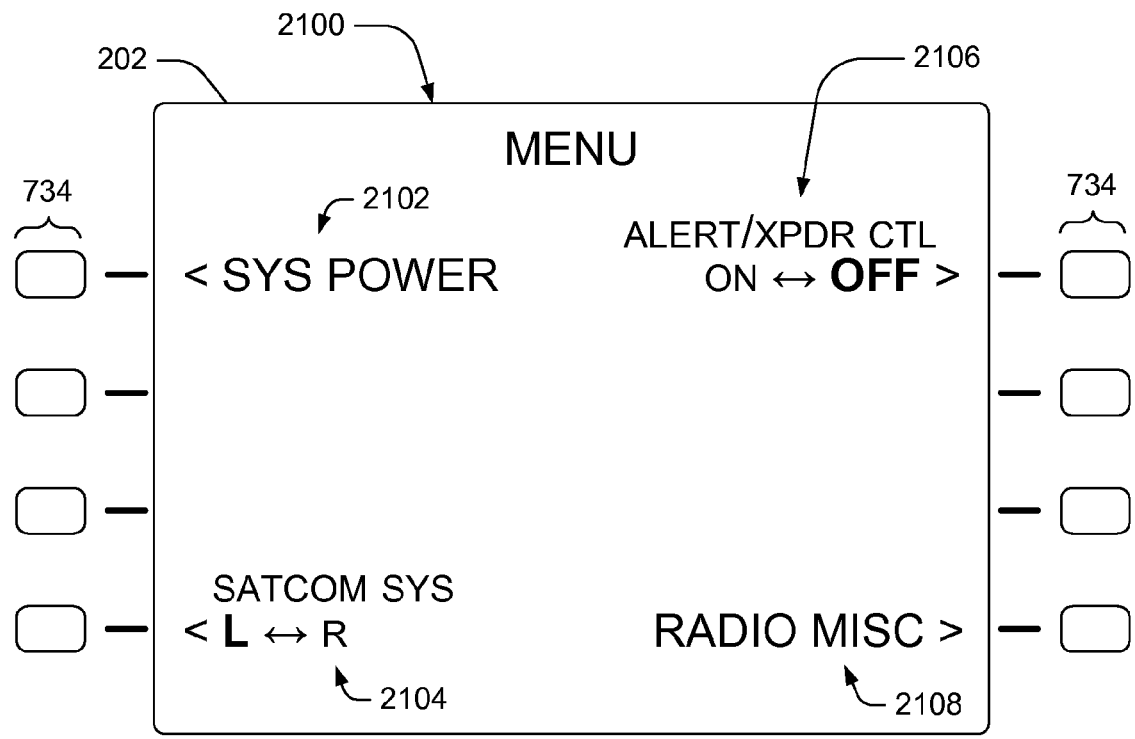
FIG. 21 is a schematic diagram of an exemplary menu interface displayable on a control unit.

FIG. 21 depicts an exemplary menu interface 2100, which is displayed upon selection of the MENU key 718 on the face plate 700. The MENU interface 2100 provides an expandable interface for additional modules to be added, which do not have a dedicated mode select key 702. In the implementation shown, the MENU interface 2100 displays a system power (SYS POWER) prompt 2102 to open a SYSTEM POWER page (FIG. 22), a SATCOM SYStem Left/Right select toggle prompt 2104 (if a second SATCOM system is installed), an alert/transponder control (ALERT/XPDR CTL) toggle prompt 2106 that when ON transfers control of the ALERT/XPDR panel to the control unit 106 and opens an ALERT/XPDR page (FIG. 23), and a RADIO MISC prompt 2108 that displays a RADIO MISC page (FIG. 24).

Figure 22:
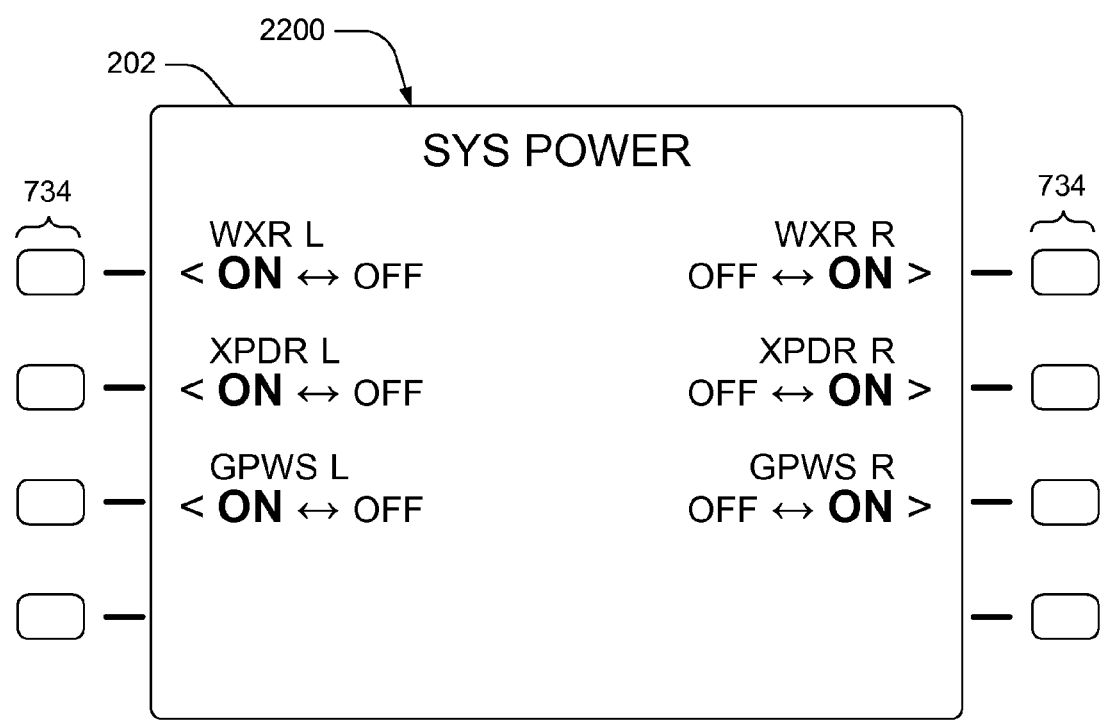
FIG. 22 is a schematic diagram of an exemplary system power interface displayable on a control unit.

FIG. 22 depicts an exemplary SYS POWER page 2200 that allows the crew to selectively de-power and re-power ISS components, such as right and left weather radar, right and left transponder, and right and left GPWS systems, in response to a loss of cooling to the forward electronics bay.

Figure 23:
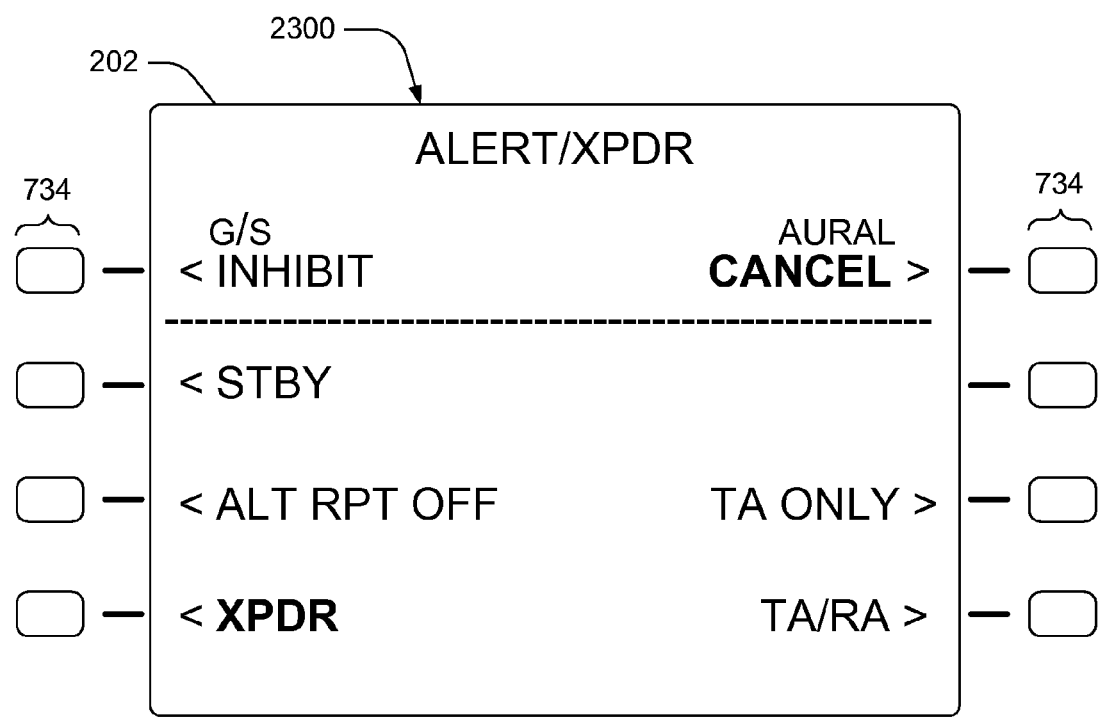
FIG. 23 is a schematic diagram of an exemplary alert/transponder (ALERT/XPDR) interface displayable on a control unit.

FIG. 23 depicts an exemplary ALERT/XPDR page 2300 that provides soft or backup controls for an alert/transponder panel located on the aisle stand. This function is considered a non-normal operation, which allows dispatch if the dedicated panel fails.

Figure 24:
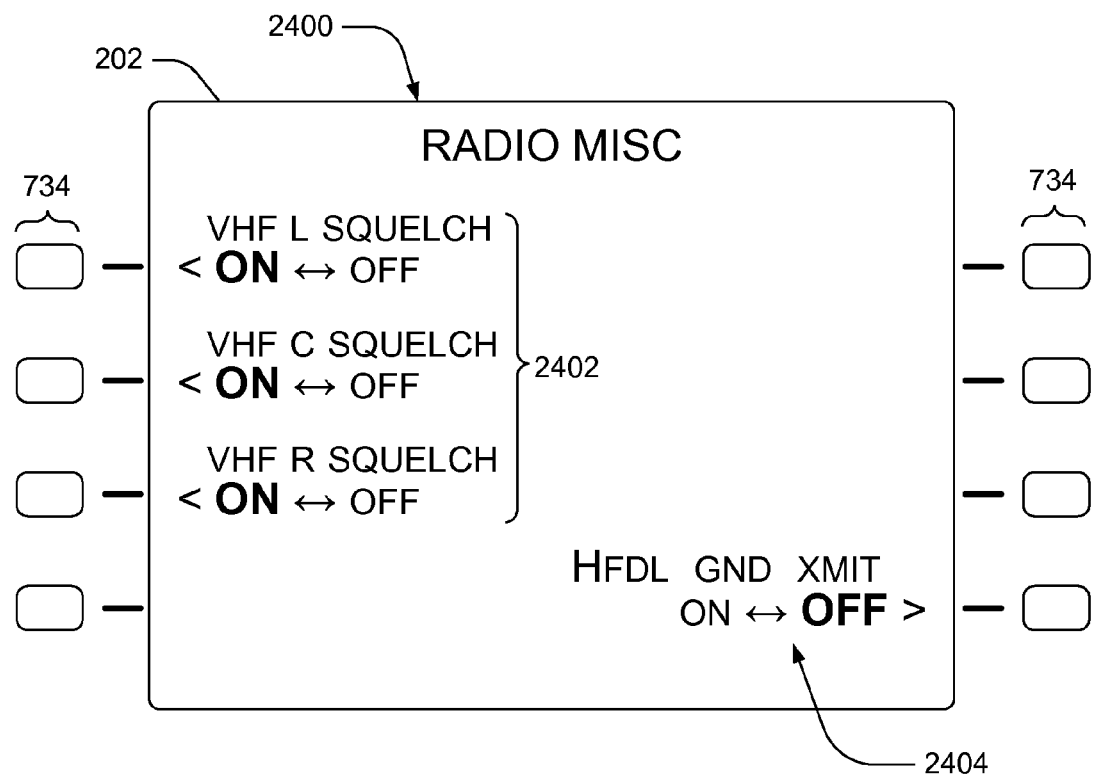
FIG. 24 is a schematic diagram of an exemplary radio miscellaneous interface displayable on a control unit.

FIG. 24 depicts an exemplary RADIO MISC page 2400, which provides access to infrequently-used radio selections, such as ON/OFF toggle prompts 2402 for left, right, and center VHF SQUELCH. A HF data link ground transmit (DATALINK GND XMIT) ON/OFF toggle prompt 2404 is provided and enables the system to transmit while on the ground.

Exemplary Control Integration Method

Figure 25:
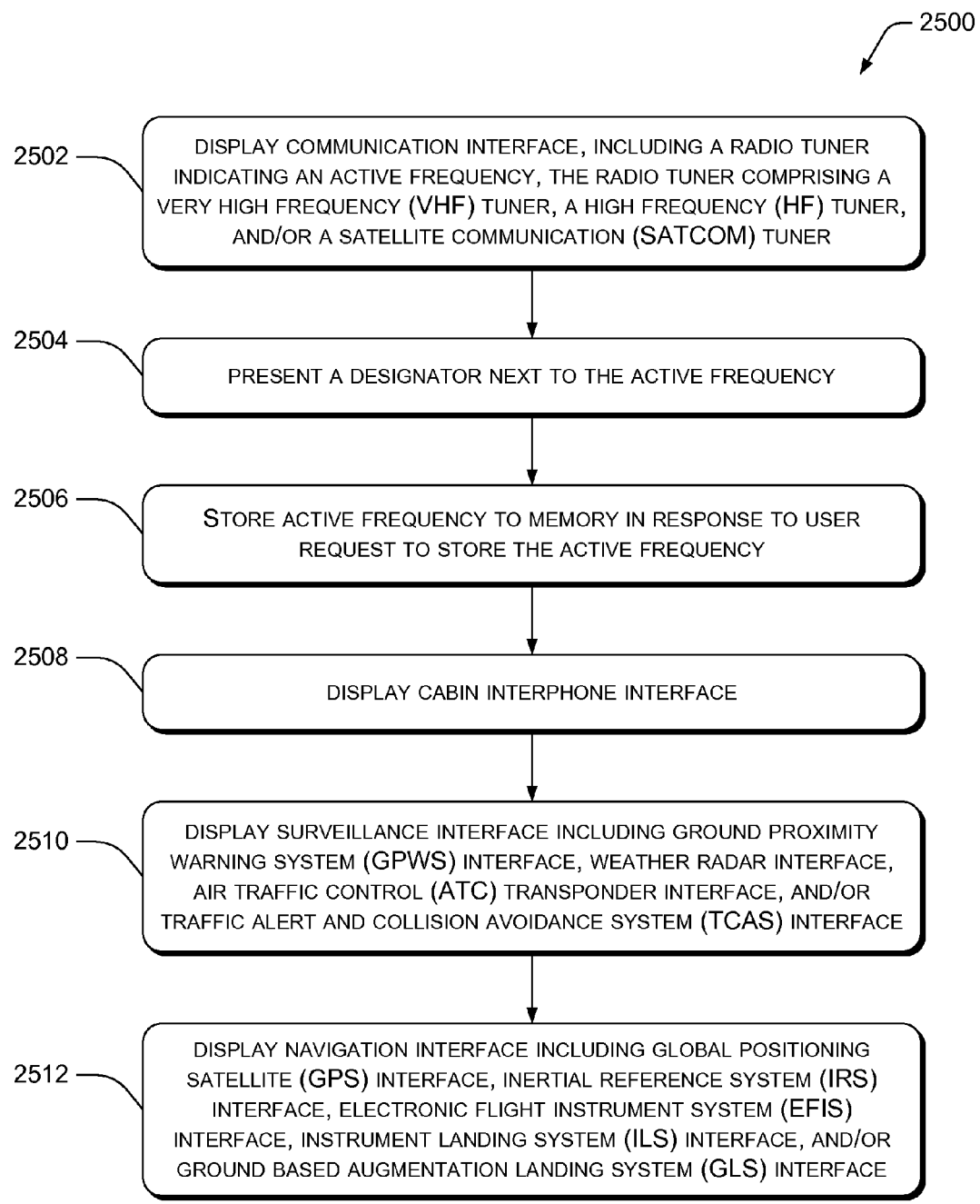
FIG. 25 is a schematic diagram of an exemplary method of integrating control of aircraft systems.

FIG. 25 illustrates an one exemplary method 2500 of integrating control of various aircraft systems. The method may, but need not, be implemented using one or more of the control units and/or modules described above. According to the method 2500, a communication interface is displayed at 2502. The communication interface comprises a tuner, such as a VHF, HF, or SATCOM radio tuner, indicating an active frequency. At 2504 a designator is presented next to the active frequency. At 2506, the active frequency may be stored to memory for subsequent use, in response to a user request to store the active frequency.

The method 2500 may additionally or alternatively include, at 2508, displaying a cabin interphone interface. The method 2500 may additionally or alternatively include, at 2510, displaying a surveillance interface, including at least one of a ground proximity warning system (GPWS) interface, a weather radar interface, an air traffic control (ATC) transponder interface, and a traffic alert and collision avoidance system (TCAS) interface. Moreover, the method 2500 may, at 2512 additionally or alternatively include displaying a navigation interface, including at least one of a global positioning satellite (GPS) system interface, an inertial reference system (IRS) interface, an electronic flight instrument system (EFIS) interface, an instrument landing system (ILS) interface, and a ground based augmentation landing system (GLS) interface.

In another implementation, the communication interface displayed by the method 2500 may comprise a very high frequency (VHF) tuner, and the method may further comprise displaying a high frequency (HF) tuner, a satellite communication (SATCOM) tuner, a cabin interphone interface, a weather radar interface, and an air traffic control (ATC) transponder interface.

It should be understood that certain acts in method 2500 need not be performed in the order described, may be modified and/or may be omitted entirely, depending on the circumstances and the needs of the given application.

Also, any of the acts described above with respect to any method may be implemented by a processor or other computing device based on instructions stored on one or more computer-readable media associated with the control unit 106. Computer-readable media can be any available media that can be accessed locally or remotely by the control unit 106. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the control unit 106. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of the any of the above should also be included within the scope of computer-readable media.

CONCLUSION

Although the invention has been described in language specific to structural features and/or methodological acts, it is to be understood that the invention is not necessarily limited to the specific features or acts described. Rather, the specific features and acts are disclosed as exemplary forms of implementing the invention.

What is claimed is:

1. An aircraft control unit installed in an aisle stand in a cockpit of an aircraft configured to control multiple systems of the aircraft, the aircraft control unit comprising:
   a display screen for displaying information to an operator of the aircraft;
   a user interface for use by the operator and used in conjunction with the display screen;
   a communication module configured to interact with the user interface and to be coupled to a communication system of the aircraft, wherein the communication module is configured to store an active radio frequency in memory for later use in response to an operator selection of a command associated with a "store active" prompt on the display screen, and wherein the communication module comprises at least one of a very high frequency (VHF) radio module, a high frequency (HF) radio module, a satellite communication (SATCOM) radio module, and a cabin interphone module;
   a surveillance module configured to interact with the user interface and to be coupled to a surveillance system of the aircraft, wherein the surveillance module comprises at least one of a ground proximity warning system (GPWS) module, a weather radar module, an air traffic control (ATC) transponder module, and a traffic alert and collision avoidance system (TCAS) module; and
   wherein the communication module and the surveillance module are configured to display information on the display screen and to receive operator input from the user interface.

2. The aircraft control unit of claim 1, further comprising a navigation module configured to be coupled to a navigation system of the aircraft.

3. The aircraft control unit of claim 2, wherein the navigation module comprises at least one of a global positioning satellite (GPS) system module, an inertial reference system (IRS) module, an electronic flight instrument system (EFIS) module, an instrument landing system (ILS) module, and a ground based augmentation landing system (GLS) module.

4. The aircraft control unit of claim 1, further comprising at least one of a warning system module configured to be coupled to a warning system of the aircraft, an emergency response system module configured to be coupled to an emergency response system of the aircraft, an environmental sensor system module configured to be coupled to an environmental sensor system of the aircraft, and a climate control system module configured to be coupled to climate control system of the aircraft.

5. The aircraft control unit of claim 1, wherein the aircraft control unit has dimensions of not more than 146 millimeters wide, 142 millimeters deep, and 162 millimeters high.

6. An aircraft comprising an isle stand having at least two of the aircraft control units of claim 1.

7. An aircraft control unit installed in a cockpit of an aircraft configured to control multiple systems of the aircraft, the aircraft control unit comprising:
   a display screen for displaying information;
   a user interface disposed about a perimeter of the display screen;
   modules configured to control one or more aircraft systems, the modules including:
     a very high frequency (VHF) radio module;
     a high frequency (HF) radio module;
     wherein the communication module is configured to store an active radio frequency in memory for later use in response to the operator selection of a command associated with a "store active" prompt on the display screen;
     a satellite communication (SATCOM) radio module;
     a cabin interphone module;
     a weather radar module;
     an air traffic control (ATC) transponder module;
     a navigation module;
     a warning system module configured to be coupled to a warning system of the aircraft;
     an emergency response system module configured to be coupled to an emergency response system of the aircraft;
     an environmental sensor system module configured to be coupled to an environmental sensor system of the aircraft;
     a climate control system module configured to be coupled to climate control system of the aircraft;
   wherein the user interface is usable to interact with each of the modules, and
   each of the modules are configured to display information on the display screen and to receive operator input from the user interface.

8. The aircraft control unit of claim 7, wherein the navigation module is configured to be coupled to an aircraft navigation system.

9. One or more computer-readable media comprising instructions for:
- displaying, via a display screen, a communication interface that includes a tuner indicating an active frequency;
- presenting a designator next to the active frequency;
- storing the active frequency to memory for subsequent use in response to a an operator selection of the designator associated with a "store active" prompt on the display screen; and
- displaying, via the display screen, any one of a cabin interphone interface, a surveillance interface, or a navigation interface in response to the operator selecting a user interface mode select key associated with respective interfaces.

10. The one or more computer-readable media of claim 9, wherein the tuner comprises at least one of a very high frequency (VHF) tuner, a high frequency (HF) tuner, and a satellite communication (SATCOM) tuner.

11. The one or more computer-readable media of claim 9, wherein the instructions for displaying the surveillance interface include displaying at least one of a ground proximity warning system (GPWS) interface, a weather radar interface, an air traffic control (ATC) transponder interface, and a traffic alert and collision avoidance system (TCAS) interface.

12. The one or more computer-readable media of claim 9, wherein the instructions for displaying the navigation interface include displaying at least one of a global positioning satellite (GPS) system interface, an inertial reference system (IRS) interface, an electronic flight instrument system (EFIS) interface, an instrument landing system (ILS) interface, and a ground based augmentation landing system (GLS) interface.

13. The one or more computer-readable media of claim 9, wherein the communication interface comprises a very high frequency (VHF) tuner, and further comprises instructions for displaying:
- a high frequency (HF) tuner;
- a satellite communication (SATCOM) tuner;
- a cabin interphone interface;
- a weather radar interface; and
- an air traffic control (ATC) transponder interface.

\* \* \* \* \*